(12) United States Patent
Lynch

(10) Patent No.: US 9,373,263 B2
(45) Date of Patent: Jun. 21, 2016

(54) DYNAMIC AND INDIVIDUALIZED SCHEDULING ENGINE FOR APP-BASED LEARNING

(71) Applicant: Pearson Education, Inc., Upper Saddle River, NJ (US)

(72) Inventor: Jay Lynch, Arvada, CO (US)

(73) Assignee: Pearson Education, Inc., New York, NY (US)

( * ) Notice: Subject to any disclaimer, the term of this patent is extended or adjusted under 35 U.S.C. 154(b) by 66 days.

(21) Appl. No.: 14/184,197

(22) Filed: Feb. 19, 2014

(65) Prior Publication Data
US 2015/0235561 A1 Aug. 20, 2015

(51) Int. Cl.
*G09B 5/02* (2006.01)
*G06Q 50/20* (2012.01)
(Continued)

(52) U.S. Cl.
CPC .............. *G09B 5/02* (2013.01); *G06F 15/0266* (2013.01); *G06F 17/30522* (2013.01); *G06F 17/30528* (2013.01); *G06F 17/30699* (2013.01);
(Continued)

(58) Field of Classification Search
CPC .............. G09B 5/00; G09B 5/06; G09B 5/08; G09B 5/14; G09B 7/00; G09B 7/02; G09B 7/04; G09B 19/00; G06Q 10/06; G06Q 10/0631; G06Q 10/06311; G06Q 10/063114; G06Q 10/063116; G06Q 10/06314; G06Q 10/06316; G06Q 10/10; G06Q 10/101; G06Q 10/109; G06Q 10/1097; G06Q 50/20; G06Q 50/205; G06F 15/0266; G06F 17/30522; G06F 17/30528; G06F 17/30699; G06F 17/30867; Y10S 706/927; Y10S 707/99943; Y10S 715/963

USPC .................... 434/322, 323, 350, 362
See application file for complete search history.

(56) References Cited

U.S. PATENT DOCUMENTS 5,601,432 A * 2/1997 Bergman ................. G09B 5/14
434/118
5,823,788 A * 10/1998 Lemelson et al. ............ 434/350
(Continued)

OTHER PUBLICATIONS

Harmon, K., "Marzano Design Question 5: Managing Student Response Rates, Part 2", Oct. 29, 2012. Retrieved from http://www.marzanocenter.com/blog/article/marzano-design-question-5-managing-student-response-rates-part-2/ on Mar. 24, 2014, 3 pages.
U.S. Appl. No. 14/184,242, filed Feb. 19, 2014, 61 pages.

*Primary Examiner* — Nikolai A Gishnock
(74) *Attorney, Agent, or Firm* — Kilpatrick Townsend & Stockton LLP

(57) ABSTRACT

Systems and methods can dynamically set user-specific schedules for prompting users to access educational content objects. An educational performance metric is identified for a user. A learning schedule is accessed that includes an identification of a plurality of learning episodes. Each of the plurality of learning episodes is associated with a time-related variable indicative of when the learning episode is to occur and a substance-related variable indicative of a learning substance for the learning episode. The learning schedule is adjusted based on the identified educational performance metric and associated with the user. A presentation time is identified based on a time-related variable in the learning schedule. An electronic content object associated with the presentation time is identified based on a substance-related variable the learning schedule. A notification with an offer to access the identified electronic content object is presented at the presentation time via a device of the user.

20 Claims, 17 Drawing Sheets

(51) Int. Cl.
  *G06F 15/02* (2006.01)
  *G06F 17/30* (2006.01)
  *G06Q 10/06* (2012.01)
  *G06Q 10/10* (2012.01)
  *G09B 5/00* (2006.01)
  *G09B 5/06* (2006.01)
  *G09B 5/08* (2006.01)
  *G09B 5/14* (2006.01)
  *G09B 7/02* (2006.01)
  *G09B 7/04* (2006.01)
  *G09B 7/00* (2006.01)
  *G09B 19/00* (2006.01)

(52) U.S. Cl.
  CPC .......... *G06F17/30867* (2013.01); *G06Q 10/06* (2013.01); *G06Q 10/0631* (2013.01); *G06Q 10/06311* (2013.01); *G06Q 10/06314* (2013.01); *G06Q 10/06316* (2013.01); *G06Q 10/063114* (2013.01); *G06Q 10/063116* (2013.01); *G06Q 10/10* (2013.01); *G06Q 10/101* (2013.01); *G06Q 10/109* (2013.01); *G06Q 10/1097* (2013.01); *G06Q 50/20* (2013.01); *G06Q 50/205* (2013.01); *G09B 5/00* (2013.01); *G09B 5/06* (2013.01); *G09B 5/08* (2013.01); *G09B 5/14* (2013.01); *G09B 7/00* (2013.01); *G09B 7/02* (2013.01); *G09B 7/04* (2013.01); *G09B 19/00* (2013.01); *Y10S 706/927* (2013.01); *Y10S 707/99943* (2013.01); *Y10S 715/963* (2013.01)

(56) References Cited

U.S. PATENT DOCUMENTS

| | | | | |
|---|---|---|---|---|
| 6,012,037 | A * | 1/2000 | Yoshikawa | G06F 15/0266 368/28 |
| 6,026,386 | A * | 2/2000 | Lannert | G09B 7/04 706/11 |
| 6,047,260 | A * | 4/2000 | Levinson | G06Q 10/063114 705/7.15 |
| 6,149,441 | A * | 11/2000 | Pellegrino et al. | 434/350 |
| 6,704,541 | B1 * | 3/2004 | Ciarallo et al. | 434/362 |
| 6,711,378 | B2 * | 3/2004 | Kashima | 434/350 |
| 6,775,518 | B2 * | 8/2004 | Norcott et al. | 434/350 |
| 6,877,987 | B2 * | 4/2005 | Kulack | G09B 19/00 434/118 |
| 6,905,341 | B1 * | 6/2005 | Whitaker | G09B 5/08 434/322 |
| 6,918,089 | B2 * | 7/2005 | Uchida | G06Q 10/06 705/7.12 |
| 6,970,858 | B1 * | 11/2005 | Nichols | G06N 5/022 706/12 |
| 7,702,531 | B2 * | 4/2010 | Draper | G06Q 10/063 705/328 |
| 7,840,175 | B2 * | 11/2010 | Hochwarth et al. | 434/362 |
| 8,265,943 | B2 * | 9/2012 | Firminger | G06Q 10/10 705/1.1 |
| 8,280,746 | B2 * | 10/2012 | Firminger | G06Q 10/10 705/1.1 |
| 8,644,755 | B2 * | 2/2014 | Krebs et al. | 434/362 |
| 8,838,016 | B2 * | 9/2014 | Wei | G09B 7/00 434/350 |
| 8,838,518 | B1 * | 9/2014 | Pocha | G06F 17/30867 706/46 |
| 2003/0113697 | A1 * | 6/2003 | Plescia | 434/322 |
| 2004/0009461 | A1 * | 1/2004 | Snyder et al. | 434/350 |
| 2004/0219493 | A1 * | 11/2004 | Phillips | G09B 5/06 434/118 |
| 2007/0174079 | A1 * | 7/2007 | Kraus | G06Q 10/10 705/3 |
| 2007/0202481 | A1 * | 8/2007 | Smith Lewis et al. | 434/323 |
| 2007/0298401 | A1 * | 12/2007 | Mohanty | G09B 5/00 434/350 |
| 2009/0035733 | A1 * | 2/2009 | Meitar | G09B 7/00 434/118 |
| 2009/0197234 | A1 * | 8/2009 | Creamer | G09B 7/00 434/350 |
| 2012/0329027 | A1 * | 12/2012 | Lewolt | 434/322 |

* cited by examiner

Initial Schedule

| Task | Duration | Presentation Time |
|---|---|---|
| Review Content Object A | - | 2/10/2014, 7pm |
| Complete Self-Quiz A | Until >80% | 2/12/2014, 7pm |
| Review Content Object B | - | 2/14/2014, 7pm |
| Complete Self-Quiz B | Until >80% | 2/17/2014, 7pm |
| Review Content Object C | - | 2/19/2014, 7pm |
| Participate in Learning Game A | 10 minutes | 2/21/2014, 7pm |
| Review Content Object D | - | 2/24/2014, 7pm |
| Complete Self-Quiz C | Complete all questions | 2/26/2014, 7pm |

FIG. 6A

Revised Schedule (after completion time for Quiz A exceeded threshold)

| Task | Duration | Presentation Time |
|---|---|---|
| Review Content Object A | - | 2/10/2014, 7pm |
| Complete Self-Quiz A | Until >80% | 2/12/2014, 7pm |
| Review Content Object B | - | 2/13/2014, 7pm |
| Complete Self-Quiz B | Until >90% | 2/14/2014, 7pm |
| Review Content Object B | - | 2/17/2014, 7pm |
| Complete Self-Quiz D | Until >90% | 2/18/2014, 7pm |
| Review Content Object C | - | 2/19/2014, 7pm |
| Review Content Object C | - | 2/20/2014, 7pm |
| Participate in Learning Game A | 10 minutes | 2/21/2014, 7pm |
| Complete Self-Quiz E | Until >90% | 2/24/2014, 7pm |
| Review Content Object D | - | 2/25/2014, 7pm |
| Review Content Objects C-D | - | 2/26/2014, 7pm |
| Complete Self-Quiz C | Complete all questions | 2/27/2014, 7pm |

FIG. 6B

|  | Average Response Time (s) | |
| --- | --- | --- |
| Question | Correct Answer | Incorrect Answer |
| 1 | 95 | 115 |
| 2 | 80 | 108 |
| 3 | 102 | 140 |
| 4 | 105 | 110 |
| 5 | 97 | 101 |
| 6 | 72 | 81 |
| 7 | 74 | 105 |
| 8 | 100 | 140 |
| 9 | 94 | 113 |
| 10 | 90 | 121 |
|  |  |  |
| TOTAL | 909 | 1134 |

FIG. 11B

DYNAMIC AND INDIVIDUALIZED SCHEDULING ENGINE FOR APP-BASED LEARNING

BACKGROUND

This disclosure relates in general to methods and systems for automatically adapting, based on a performance metric associated with the user, a learning schedule for prompting a user to access content objects, and for collecting and aggregating users' delay in electronically responding to educational questions.

Traditionally, courses operated on fixed schedules. Students were largely left on their own to develop effective studying techniques, and instructors frequently relied on coarse and infrequent feedback (e.g., quizzes) to gauge students' understanding of material. Such situations frequently lead to students investing insufficient or excessive study time and to instructors allocating instruction time and materials inefficiently.

SUMMARY

In one embodiment, the present disclosure provides a method and system for dynamically generating and updating learning schedule for an individual user based on one or more performance metrics associated with the user. The learning schedule can include learning episodes, each of which can be associated with a time-related variable indicating when the episode is to occur and with a substance-related variable indicative of a substance of the episode (e.g., a content object to be presented). Upon detecting, per a time-related variable in a schedule, a scheduled episode time, a notification can be automatically presented on a device of the user. The notification can itself include an educational content object or can present a link or other option that, upon user selection, directs the user to the content object. As one illustration, a schedule may include a list of 20 learning episodes (scheduled to occur during various times during a weekend), and at each learning episode, a user device may present 5 of 50 vocabulary words and definitions or may quiz the user on the definition of 5 vocabulary words.

A performance of a user can then be dynamically evaluated in view of a performance goal, and the learning schedule can be dynamically adjusted based on the evaluation. The adjustment may include, e.g., adding or removing episodes, changing an episode difficulty or duration, changing a time for an episode and/or changing a substance (e.g., content object) of an episode.

To illustrate, a student may identify a target grade as being an 'A'. A default schedule can include three study episodes a week, where it is recommended that the student study a same 30 pages of electronic reading material during each of the episodes. One week into the schedule, the student may complete an electronic assessment (e.g., an electronic quiz) and receive a grade of a 'C'. The schedule can then be adjusted such that it includes four study episodes a week.

As another example, the default target grade can correspond to a passing-grade threshold. A default schedule can be generated for a particular user, based on grades received for previous courses. The default schedule can recommend that the student engage in ungraded electronic quizzes two times per day. Two weeks into the schedule, an instructor may indicate that a grade for the student is 10% below passing. The schedule can be adjusted to increase the recommended number of classes per day.

In some embodiments, an educational-app system is provided for dynamically setting user-specific schedules for prompting users to access educational content objects. A performance assessment engine identifies an educational performance metric for a user. A dynamic learning scheduler accesses a learning schedule. The learning schedule includes an identification of a plurality of learning episodes. Each of the plurality of learning episodes is associated with a time-related variable indicative of when the learning episode is to occur and a substance-related variable indicative of a learning substance for the learning episode. The dynamic learning scheduler adjusts the learning schedule based on the identified educational performance metric. The adjusted learning schedule is associated with the user. A content availer identifies a presentation time based on a time-related variable in the learning schedule. The content availer also identifies an electronic content object associated with the presentation time based on a substance-related variable the learning schedule. An interface engine causes a notification to be presented at the presentation time via a device of the user, the notification including an offer to access the identified electronic content object.

In some embodiments, a computer-implemented method is provided for dynamically setting user-specific schedules for prompting users to access educational content objects. An educational performance metric is identified for a user. A learning schedule is accessed. The learning schedule includes an identification of a plurality of learning episodes. Each of the plurality of learning episodes is associated with a time-related variable indicative of when the learning episode is to occur and a substance-related variable indicative of a learning substance for the learning episode. The learning schedule is adjusted based on the identified educational performance metric. The adjusted learning schedule is associated with the user. A presentation time is identified based on a time-related variable in the learning schedule. An electronic content object associated with the presentation time is identified based on a substance-related variable the learning schedule. A notification is caused to be presented at the presentation time via a device of the user. The notification includes an offer to access the identified electronic content object.

Frequently, concept mastery is evaluated based on accuracy of students' answers. However, identifying how long students took to respond to questions can also be indicative of their understanding. In one embodiment, the present disclosure provides a method and system for dynamically receiving, aggregating and processing data from user devices that identify a latency between a response submission and a question presentation. A response can be one to, e.g., a question electronically provided on a user device (e.g., via an app), one verbally provided by an instructor, or one visually provided by an instructor (e.g., via a projector).

In some instances, response times are detected for each user in a set of users (e.g., students enrolled in a virtual or in-person class or students physically or virtually present at an event, such as a lecture). In some instances, the response times are separated into one or more groups (e.g., based on answer selection or a user characteristic). The response times can then be processed to, e.g., generate one or more statistics, distributions, graphs, tables and/or other representations. For example, a first distribution of response times can be generated for a group of responses corresponding to a selection of a correct answer choice, and a second distribution of response times can be generated for other responses in the set. In some instances, a representation of the processed data can then be presented (e.g., on an instructor device).

This technique may be performed in real-time and may include updating the aggregation, processing and/or representation as new answers are received. The technique may include processing response times for each of a set of questions, such that questions associated with relatively long or short response times can be identified. Thus, instructors may be able to use response times as a proxy for students' understand of a concept and a confidence thereof. She may then choose to adjust her teaching technique accordingly.

In some embodiments, an educational-app engine is provided for tracking, at a group level, times for responding to educational questions. A performance assessment engine accesses a set of responses. Each response in the set of responses being one submitted via an electronic user device in response to one or more educational questions. The performance assessment engine also identifies, for each response in the set of responses, an accuracy of the response, and a response time for the response. The response time is indicative of a time between presentation of the one or more questions and submission the response. An aggregator identifies a set of users as users enrolled in an academic course. Each response in the set of responses corresponds to a user in the set of users. The aggregator also aggregates the identified response times for at least two responses in the set of responses. An interface engine causes a representation of the aggregation to be presented.

In some embodiments, a computer-implemented method is provided for tracking, at a group level, times for responding to educational questions. A set of users is identified as users enrolled in an academic course. A set of responses is accessed (e.g., after being received). Each response in the set of responses is one submitted via an electronic user device associated with a user in the set of users and is one submitted in response to one or more educational questions. For each response in the set of responses, an accuracy of the response is identified and a response time for the response is identified. The response time is indicative of a time between presentation of the one or more questions and submission the response. The identified response times for at least two responses in the set of responses are aggregated. A representation of the aggregation is caused to be presented.

In some embodiments, a computer-program product tangibly embodied in a non-transitory machine-readable storage medium is provided. The product includes instructions configured to cause one or more data processors to perform a method disclosed herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures:

FIGS. 6A-6B illustrate representations of exemplary schedules;

FIGS. 11A-11B illustrate representations of aggregated metrics;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
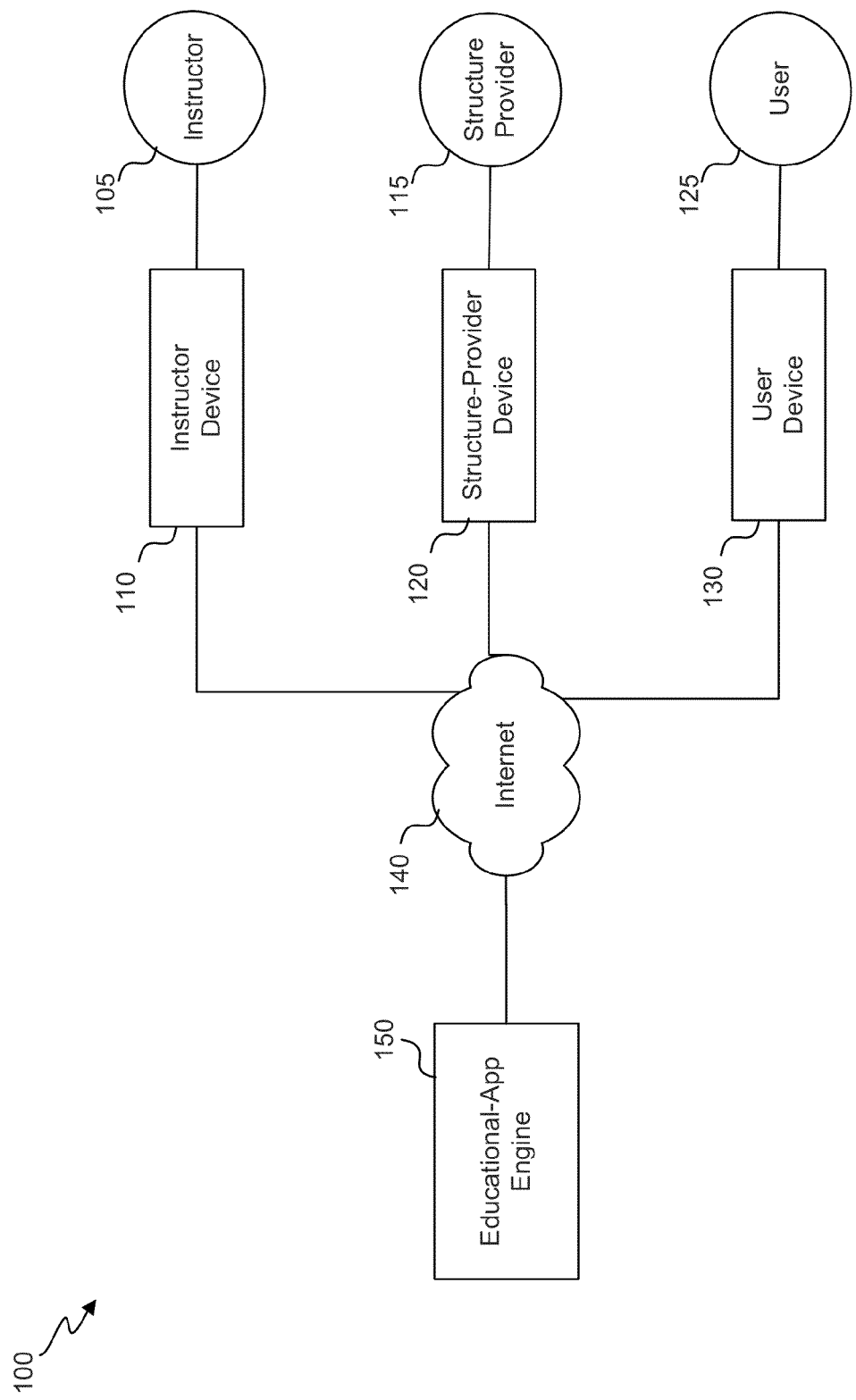
FIG. 1 depicts a block diagram of an embodiment of an education-app interaction system.

Referring first to FIG. 1, a block diagram of an embodiment of an education-app interaction system 100 is shown. An instructor 105, structure definer 115 and/or user 125 can interact with an education-app engine 150 via respective devices 110, 120 and/or 130 and a network, such as the Internet 140 or a wide area network (WAN), local area network (LAN) or other backbone. In some embodiments, education-app engine 150 is made available to one or more of instructor 105, structure definer 115 and/or user 125 via an app (that can be downloaded to and executed on a portable electronic device) or a website. It will be understood that, although only one instructor 105, user 115 and/or user 125 are shown, system 100 can include multiple instructors 105, structure definers 115 and/or users 125.

Instructor device 110, structure-provider device 120 and/or user device 130 can each be a single electronic device, such as a hand-held electronic device (e.g., a smartphone). It will be understood that instructor device 110, structure-provider device 120 and/or user device 130 can also include a system that includes multiple devices and/or components. The device(s) 110, 120 and/or 130 can comprise a computer, such as the desktop computer, a laptop computer or a tablet. In some instances, a party 105, 115 and/or 125 uses different devices at different times to interact with the education-app engine 150. For example, user 125 may use a mobile phone to set a target online course completion date and can use a laptop computer to access content for the course.

An instructor (who can alternatively or additionally be a course coordinator, administrator and/or other party) can define characteristics for course. The characteristics can include, for example, an identification of each user enrolled in a course, material to be covered in the course, assignments, assessments (e.g., quizzes or test), grade cutoffs (e.g., thresholds for receiving particular letter grades or a passing threshold) and so on. The characteristics can also include a target grade for the course overall for one or more particular portions of the course (e.g., assessments).

The instructor can define or select a structure for the course. The structure can include structure elements, such as assignments, evaluation points and/or other events. The structure can identify which (if any) structure elements are required and/or graded.

A structure element can reference one or more electronic or non-electronic content objects. For example, an assignment can include reading an electronic chapter or a task can include completing an electronic quiz. A content object can include a, e.g., a text file, formatted document, webpage, image, etc. Content objects can include an informational content object, (e.g., a publication, learning module, learning object or book chapter) and/or an interactive content object (e.g., a dynamic informational learning object that selectively presents information based on user input, a game and/or an assessment, such as a quiz). Some content objects can be provided along with an answer or grading key and/or grading capability (e.g., automatic electronic grading capability).

The structure can include, or an instructor can otherwise define, a course schedule for engaging in a more completing structure elements. For example, a course schedule can indicate that a test is to be taken on a particular date or that one or more assignments are to be completed within a particular week. A course schedule can be defined in terms of absolute times or relative times (e.g., such that schedule dates depend on a date on which a user begins the course). The structure and/or schedule for a course can, in some instances, apply to a group of students enrolled in the course or all students enrolled in the course.

Using the course schedule, educational-app engine 150 can generate a learning schedule. The learning schedule can be specific for or tailored for a specific user and can identify recommendations as to when a particular user should engage in studying for the course. Thus, the learning schedule can also include learning episodes, with each learning episode identifying a task. The task can include reviewing or completing a content object (e.g., an electronic or non-electronic content object).

In some instances, an initial learning schedule is defined to be a default learning schedule, which can then be modified based on performance of a user. In some instances, the initial learning schedule itself depends on a performance of the user and can subsequently be further adjusted based on new performance metrics. A performance metric can include, for example, a grade entered by an instructor, a performance variable (e.g., performance score or completion time) received on an electronic assessment associated with the course, a performance variable on an electronic assessment associated with another course, and/or a grade received for another course.

The learning schedule can further be based on a target grade, which can be identified by an instructor or by a user. Thus, as one example, educational-app engine 150 can identify a score received on a recent assessment for course and compare the score to a target grade is identified by the user. If the score is below the target grade, educational-app engine 150 can adjust the learning schedule to increase a number of recommended learning episodes.

Based on the learning schedule, educational-app engine 150 can notify user 125 of study recommendations. Each recommendation can correspond to a learning episode in the schedule. Each learning episode can be associated with an episode time (e.g., indicative of when the notification is to occur), a task (e.g., to be performed during the learning episode), a content object (e.g., to be accessed and/or completed during the learning episode), a goal (e.g., for the episode or course) and/or time duration (e.g., for the episode). For example, one recommendation can include a recommendation to study a particular educational electronic module for 15 minutes on Tuesday evening. As another example, one recommendation can include a recommendation to repeatedly complete and ungraded electronic quiz until the user receives a 100% two consecutive times.

Notifications can take various forms. In one instance, presenting the notification includes pushing an alert such that an alert screen, image, text or icon is automatically displayed on user device 125 at an episode time corresponding to a learning episode in the learning episode. The alert can be generic or specific to a recommendation (e.g., such that it identifies a recommended task). In one instance, the alert is formatted such that it immediately presents part or all of a content object or task. In one instance, a content object or task is presented when a user enters input requesting such material. For example, an alert representation can include "Study Time!" or "Review plant vocabulary" and can include a button or other mechanism (e.g., a "Study now" button) that will direct a user device to a content object associated with the alert upon detecting that the user selected the bucket.

Thus, educational-app engine 150 can generate a learning schedule that identifies educational tasks to perform at particular times or a particular number of times. Based on the learning schedule, each user device 125 can automatically present users with the opportunity to engage in the tasks according to the schedule. The learning schedule can be generated and/or updated based on performance of the particular user, such that the schedule efficiently moves the user towards reaching a target (e.g., a target grade or score).

As described herein, educational-app engine 150 can analyze a performance metric and adjust a user's learning schedule. In some instances, this performance metric relates to an accuracy of a response to one or more questions. In some instances, this performance metric alternatively or additionally relates to a temporal variable, such as a time between an answer presentation and answer submission. For example, a learning schedule can be adjusted to include more scheduled learning episodes upon detecting long delays between question presentations and answer submissions.

Education-app engine 150 can also aggregate performance metrics and present the aggregated metrics (and/or a processed version thereof) to an instructor 105. In one instance, education-app engine 150 tracks how quickly each user in a group of users (e.g., enrollees in a course) responds to a question using respective user devices 130. The response time can be based on a starting time defined as a time that a question was electronically presented on a user device or other device or as a time corresponding to an input received from an instructor (e.g., such that an instructor can pose a verbal question in class and track students' response times).

Response times can be aggregated across all users who submitted a response or aggregation can be selectively performed (e.g., to aggregate response times in a response-specific basis or to aggregate response times for all users who submitted any of one or more particular answers, such as a correct answer or any incorrect answer). The aggregated response times can be processed to, e.g., generate a distribution or statistic (e.g., average, standard deviation or range). In some instances, this aggregation can be repeatedly or continuously performed, such that a result of the aggregation or processing is repeatedly updated based on newly received responses.

The aggregation and/or processing can be performed on an instructor device 110 or on a central server, and a representation of a result of the aggregation or processing can be presented on an instructor device 110. In some instances, the representation associates the result with a question identifier and/or a question. Thus, an instructor may be able to assess students' confidence and knowledge pertaining to a topic based on their response times.

Figure 2:
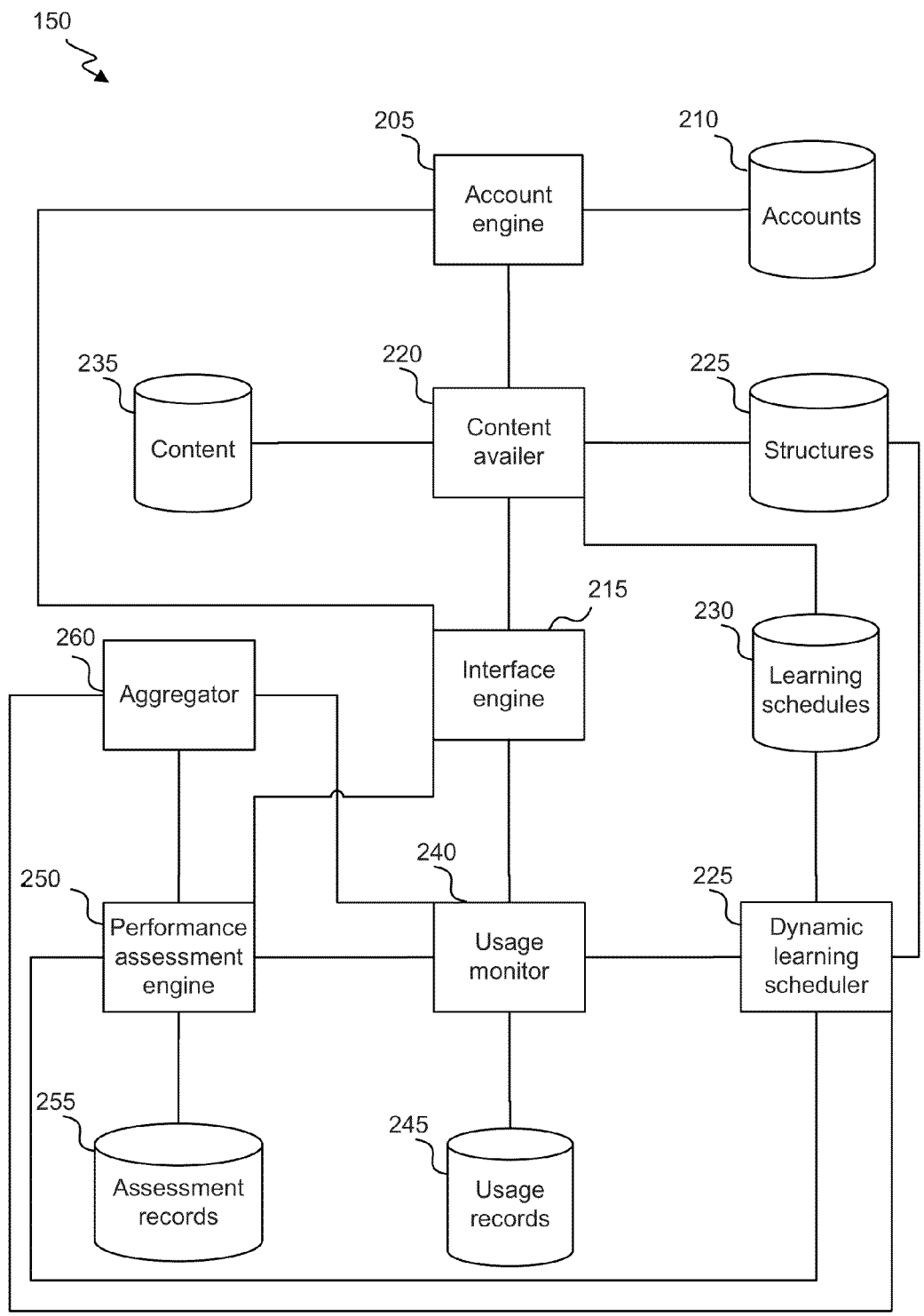
FIG. 2 depicts a block diagram of an embodiment of an education-app engine.

Referring next to FIG. 2, a block diagram of an embodiment of education-app engine 150 is shown. Education-app engine 150 can be, in part or in its entirety, in a cloud. In some instances, at least part of education-app engine 150 is present on a device, such as an instructor device 110 and/or user device 130. Thus, education-app engine 150 can include a distributed system. For example, interface engine 215 may be present on each of a user device and interface device, and account engine 205, dynamic learning scheduler 225, performance assessment engine 250 and aggregator 260 may be present on a remote server. As another illustration, aggregator 260 may be present on an instructor device, and device learning scheduler 225 may be present on a user device.

Education-app engine 150 includes an account engine 205, which generates and maintains accounts for users 125 and verifies identities of users 125. Account engine 205 can collect, e.g., personal (e.g., name, email address, residence address, telephone number and occupation), academic (e.g., grade level, current grade, school, one or more teachers, interests, course history, and course enrollment), and/or login (e.g., username and password) information. Account information can be stored in account data store 210. Further, account engine 205 can characterize a system-accessing party as a particular user 125 (e.g., based on a login name or device identifier) and can verify an identity of take user by, e.g., ensuring that information entered by the party (e.g., login information) matches that in a stored account.

Thus, account engine 205 can interact with interface engine 215 both during account generation and account verification. For example, interface engine 215 can provide one or more interfaces that allows one or more parties (e.g., a user, a teacher and/or an administrator) to enter information required to set up a new account (e.g., personal, academic and login information). Subsequently, interface engine 215 can provide a login interface that allows a user to enter login information, which can be verified prior to providing the user with access to a corresponding account, one or more structures and/or one or more content objects.

Interface engine 215 can generate displays or screens that convey information or content and/or that receive input. The displays or screens can be dynamic, such that the content displayed changes, for example, in response to an automatic update or user input. The displays or screens can be ones that can be presented on a device, such as an instructor or user device, computer and/or mobile device. The displays or screens can be customized based on a particular presentation device (e.g., a resolution, screen size, operating system, web browser, etc.) and/or preferences (e.g. the preferences a user indicating how content is to be displayed and/or what types of content displayed).

A content availer 220 can identify one or more structures (stored in structures data store 225) associated with a user. For example, structure data store 225 can associate each of one, more or all stored structures with an involvement, such as an in-person or virtual course. Additionally or alternatively, an account of a user may identify particular involvements (e.g., course enrollments). Content availer 220 can then identify an appropriate structure for each of the user's particular involvements.

The structure can include structure elements, such as assignments, evaluation points and/or other events. Through such elements or through other features of the structure, the structure can identify material that a user is expected to know. For example, when a structure identifies graded assessments, it may be inferred that a user is to be responsible for learning material associated with the assessment and/or learning material from one or more content objects associated with the assessment (e.g., reading material assigned before or associated with the assessment).

A dynamic learning scheduler 225 can identify a course schedule associated with the structure. In some instances, the structure includes or identifies the course schedule. In some instances, dynamic learning scheduler 225 generates the course schedule based on data from the structure and user-specific data (e.g., a current time, a user-defined start time, a user-defined completion time, etc.). The course schedule can include an absolute or relative time for completing each of one, more or all elements in the structure (e.g., tasks). Thus, for example, a course schedule can identify assignment due dates and/or dates of exams.

Dynamic learning scheduler 225 can then tailor then generate a user-specific schedule based on the course schedule. The user-specific schedule can include a set of learning episodes, each of which identifies various one or more studying tasks. Such tasks can be focused to promote a likelihood that the user will reach a target score. The target score can be set by a user or an instructor or can be otherwise defined (e.g., set to a default fixed value).

Tasks in the learning schedule can include reviewing assigned reading material, completing practice quizzes, reviewing supplemental material or other tasks. In some instances, one or more tasks in the learning schedule relate to an electronic content object. For example, a task can include reviewing an electronic book chapter or taking an electronic quiz. One, more or all content objects identified in a learning schedule may, or may not, be the same content objects referenced in a structure for course and or in a course-specific schedule. For example, a structure may indicate that a user is to (as an assignment) read pages 100-135 in an electronic book, and a user-specific schedule can include a task to review some or all of this section. As another example, a structure may indicate that a user is to read an electronic document pertaining to "Types of Rocks", and a user-specific schedule can include a task to read another document pertaining to a same subject.

Dynamic learning scheduler 225 can store learning schedules and learning schedule data store 230. Each learning schedule can be, in some instances, associated with one or more users. Content availer 220 can identify a learning schedule applicable for a given user (e.g., based on schedule associations and/or account data indicating a user's class enrollments) and retrieve the schedule from learning schedule data store 230.

Using a learning schedule, content availer 220 can detect an episode time associated with an episode in the schedule. For example, an episode in the schedule may be associated with an absolute episode time, and content availer 220 can detect that it is or recently was the absolute episode time. As another example, an episode in the schedule may be associated with an episode time range, and content availer 220 can detect that it is a time within the episode time range.

Content availer 220 can further identify the task and/or content object associated with the episode. For example, content availer 220 can identify that a particular episode is associated with the task, which can include reviewing, reading or completing a particular content object.

Content availer 220 can generate or access a notification that includes an offer to access a content object associated with the episode and/or to complete a task associated with the episode. The notification may, or may not, include information specific to the episode. For example, a notification can include a generic offer to review material for course (e.g., "Study now" or "Review reading" text or an audio tone indicative of an availability of a content object associated with a learning episode). As another example, a notification can identify a task, one or more task details and/or the content object associated with the episode (e.g., "Review pages 1-5 of Chapter 1", "Quiz: vocabulary words", "Review Species module for 5 minutes"). As yet another example, a notification can include part or all of the content object (e.g., immediately presenting a first quiz question, presenting a first paragraph of an electronic content object prior to receiving any user input or starting an audio review lesson). Thus, notifications can include various types of offers to access content objects: to accept an offer, a user may need to make one or more selections (e.g., press a button) or a user may need to merely view a screen.

Interface engine 215 can then present the notification. In some instances, the presentation can provide a user with an option to accept and/or decline the offer to access a content object (e.g., with accept/decline, yes/no, now/postpone buttons etc.). In one instance, the presentation can be identify or can otherwise be indicative of an action that a user can take to access the content object (e.g., a message or icon indicating that the content object for a learning episode is available and can be accessed by opening an app or selecting a menu item).

Automatically, or in response to corresponding user input, content availer 220 can retrieve one or more electronic content objects from content data store 235 and trigger interface engine 215 to present part or all of a content object associated with a learning episode. The presentation can include a visual and/or audio presentation.

A usage monitor 240 can receive and record user input and/or access corresponding to presented content. For example, usage monitor 240 can record whether a content object is presented on a device of a user, when a presentation of a content object begins and/or ends, whether and/or when a user scrolls through the content object or otherwise progresses through the object (e.g., by requesting new pages) and/or whether and/or when a user enters inputs (e.g., answers to electronic assignment, quiz or test questions). Thus, in some instances, usage monitor 235 detects whether a user accepted an offer to engage in a learning episode, complete a learning-episode task and/or access a learning-episode content object. The occurrence of, the timing of and/or the type of interactions (e.g., which can include specific answers) can be stored in association with the user in a usage-record data store 245.

A performance assessment engine 250 can determine a performance metric for a user. The performance metric can be determined based on, for example, answers provided by the user via a user device (e.g., responsive to an electronic assessment or to otherwise provided written or verbal or audio questions) or input provided by an instructor or other party (e.g. a current grade in a course, a current or past grade for another course, or a grade on a recent test or assignment). For example, one learning episode can prompt the user to complete an electronic self-quiz using his user device. The quiz can be automatically scored, and the score can be used as a performance metric. As another example, an instructor can use an instructor device to identify a student and to indicate that the student received a particular grade on a paper or midterm.

In one instance, the performance metric is related to a response time. Shorter response times coupled with accurate answers can be used as a basis to infer that a user is comfortable material. Response times can be calculated on a question-specific basis or across the group of questions. For example, a single response time can reflect how long it took a student to complete a 10-question quiz or how long before a moving-average score of a user for a quiz surpassed a threshold.

In some instances, it can be advantageous to analyze response times in combination with response selections and/or response accuracies. A performance metric may, in some instances, be calculated using a function based both on an accuracy variable and a response-time variable. In one instance, the function sets the metric to zero if a response is inaccurate or if a score is below a threshold and sets the metric to a value dependent on the response time otherwise. In one instance, and assessment is ongoing until a user has reached a set accuracy or skill level. For example, questions can continually be presented until a user answers 10 in a row correctly. In this case, the response time for the completion of the task can itself reflect the user's accuracy.

Performance metrics may or may not been normalized. The normalization factor can be based on, for example, corresponding metrics associated with other users, a target metric, one or more past metrics associated with the user, etc.

Performance assessment engine 250 can store performance metrics in assessment record data store 255. Each of one, more or all metrics can be stored in association with one or more variables such as an identification of a user corresponding to the metric, an identification of an assessment or source (e.g., instructor) corresponding to the metric, a time (e.g., a time at which an assessment giving rise to the metric was completed or a time at which an input identifying the metric was received), a structure and/or a course.

Dynamic learning scheduler 225 can use usage data and/or one or more performance metrics to adjust a learning schedule for a user. In one instance, dynamic learning scheduler 225 analyzes performance metric to estimate a user's understanding of one or more concepts. This analysis can include assessing the performance metric in isolation, in view of a past performance metric of the user or in view of corresponding performance metrics for other users.

This analysis can include assessing the performance metric in view of a target metric, such that it can (for example) be determined whether (and/or an extent to which) the performance metric is below the target metric and/or is on track to meet the target metric (e.g., using an extrapolation technique or a model). The target metric can be associated with a course in general, an instructor, a user, a structure, an assessment, etc. The target metric can be identified based on input provided by, e.g., an instructor or the user.

Based on the assessment, dynamic learning scheduler 225 can adjust a learning schedule. The adjustment can include, e.g., adding or removing learning episodes and/or changing a time, task and/or content object associated with each of one or more learning episodes. For example, if a performance metric suggests that a user does not understand a concept, then a content object associated with a subsequent episode can be changed or adjusted to emphasize the concept (e.g., to describe or review the concept or to present questions pertaining to the concept). As another example, if a performance metric is determined to be low, learning episodes can be added to the learning schedule, an amount of material to be presented or assessed in an episode can be increased, and/or a duration of an episode can be increased. Conversely, if a performance metric exceeds a threshold, the schedule can be adjusted to remove or shorten one or more learning episodes or to change a content object for one or more learning episodes (e.g., to objects associated with new concepts and/or higher skill levels).

Thus, educational-app engine 150 can develop and dynamically refine learning schedules. In some instances, by integrating electronic and/or app-based assessments into the schedule, engine 150 can perform the refinement automatically without requiring repeated involvement by non-user parties. Engine 150 can thereby tailor learning recommendations to specific users based on repeated evaluations performance indicative of an understanding of course material.

In addition to such user-specific capabilities, educational-app engine 150 can also include aggregator 260 such that higher-level information can be collected. Aggregator 260 can identify a group of users. The group can correspond to users enrolled in a particular class, present in a setting (e.g., a classroom), a group identified by an instructor, a group sharing a characteristic is identified by the instructor, a group associated with a performance metric or grade satisfying a criteria (e.g., under-performing group of students), a group with devices in a geographical or functional area (e.g., a classroom), a group concurrently attending an event (e.g., physically or virtually attending a lecture), etc. This identification can be performed using (for example) account data (e.g., to detect users enrolled in a given course), using electronic activity (e.g., to detect nearby devices, devices in a geographical area, devices executing an app, devices receiving user input, etc.), and/or using input (e.g., from an instructor or administrator that defines the group).

Aggregator 260 can collect one or more performance metrics for each of some or all users in the group. For example, a performance metric can be based on, for example, whether a response to a question was accurate; a score for an electronic quiz or set of questions; a time responding to a question; and/or a time for completing an assignment, quiz course set of questions.

In one instance, one or more performance metrics are collected for each user in the group. In one instance, one or more performance metrics are collected for each user for which the metric is available. In one instance, one or more performance metrics are collected for another subset of users (e.g., those with a course grade the lower threshold or specifically identified by an instructor).

In some instances, aggregator 260 aggregates all collected corresponding metrics together. In other instances, aggregator 260 selectively aggregates corresponding metrics. For example, in one instance, for a multiple-choice question, response times may be separately aggregated for each of the answer choices (thereby resulting in an aggregation for each answer choice). As another example, all response times corresponding to a correct answer for a question may be aggregated, and all response times corresponding to any of a set of incorrect answers may be separately aggregated. As another example, response times for each of a set of questions can be aggregated on a question-specific basis, but only for those users with an overall quiz score above a threshold. As yet another example, response times can be separately aggregated based on users' current letter grades in a course.

It will be appreciated that aggregator 260 can collect other information in addition to performance metrics. For example, aggregator 260 can associate each performance metric with a user, one or more characteristics of the user (e.g., a current grade, a target grade, an age), time at which a response was received, etc.

Aggregator can process each of one or more aggregations. For example, in some instances, aggregator 260 can calculate a statistic based on each of one, more or all aggregations. The statistic can include, e.g., a mean, median, mode, standard deviation, or range. Aggregator 260 can generate a distribution based on each of one, more or all aggregations.

Aggregator 260 can generate a representation based on each of one, more or all aggregations. The representation can include, for example, a list (e.g., of the aggregated performance metrics), a table (e.g., with each row corresponding to a response, one or more columns corresponding to one or more performance metrics and potentially other columns to identify other user or assessment variables), a statistic, and/or a graph (e.g., a distribution graph, a scatter plot or a bar graph). In some instances, the representation includes data for each of multiple types of performance metrics. For example, a first table may show a percentage of students responded with the correct answer, and a second graph may show distribution of response times for those students who responded with the correct answer. As another example, a scatter plot can include points for individual students and can plot a quiz score versus quiz-completion time.

The representation can be caused to be presented on an instructor device 110. In some instances, aggregator 260 is on instructor device 110, and the representation can then be itself generated and subsequently presented on the device. In some instances, the representation is generated elsewhere and is transmitted to instructor device 110.

In one instance, the representation is interactive, such that the representation changes in response to receipt input. The input may be indicative of a filter to apply and/or may specify a level of interest. For example, an instructor may indicate that she would like to see performance metrics for those students who received a failing grade on a previous exam, and a representation can be accordingly updated or generated (e.g., which may include updating an aggregation and/or processing) as another example, an instructor may click on particular point in a scatter plot or a bar in a distribution curve, and information about the response or student associated with the point or bar can then be presented.

In some instances, the aggregation can be repeatedly performed as new performance metrics are made available. For example, in a class of 100, initial performance metrics may be available for 10 students, and an aggregation can be performed using this available data. Subsequently, more students may respond to a question, and the aggregation can be updated to include data corresponding to the new responses, and one or more statistics and/or representations can also be updated. The updates can be performed, for example, at routine intervals, based on detection of one or threshold number of performance metrics or substantially continuously.

This representation can allow an instructor to gauge how comfortable students are with the concept. Accurate responses and/or faster responses can be indicative of understanding and confidence. An instructor can then tailor teaching techniques accordingly.

In one instance, this technique can be used in a real-time classroom or virtual setting. An instructor can present a question visually (e.g., using a projector or blackboard), verbally or electronically (e.g., such that it is presented on one or more user devices), and each user can use a user device (e.g., a mobile device, computer or a classroom device integrated into or provided on a desk or chair) to respond to the question. This can allow an instructor to dynamically adjust a lecture in real-time.

Figure 3:
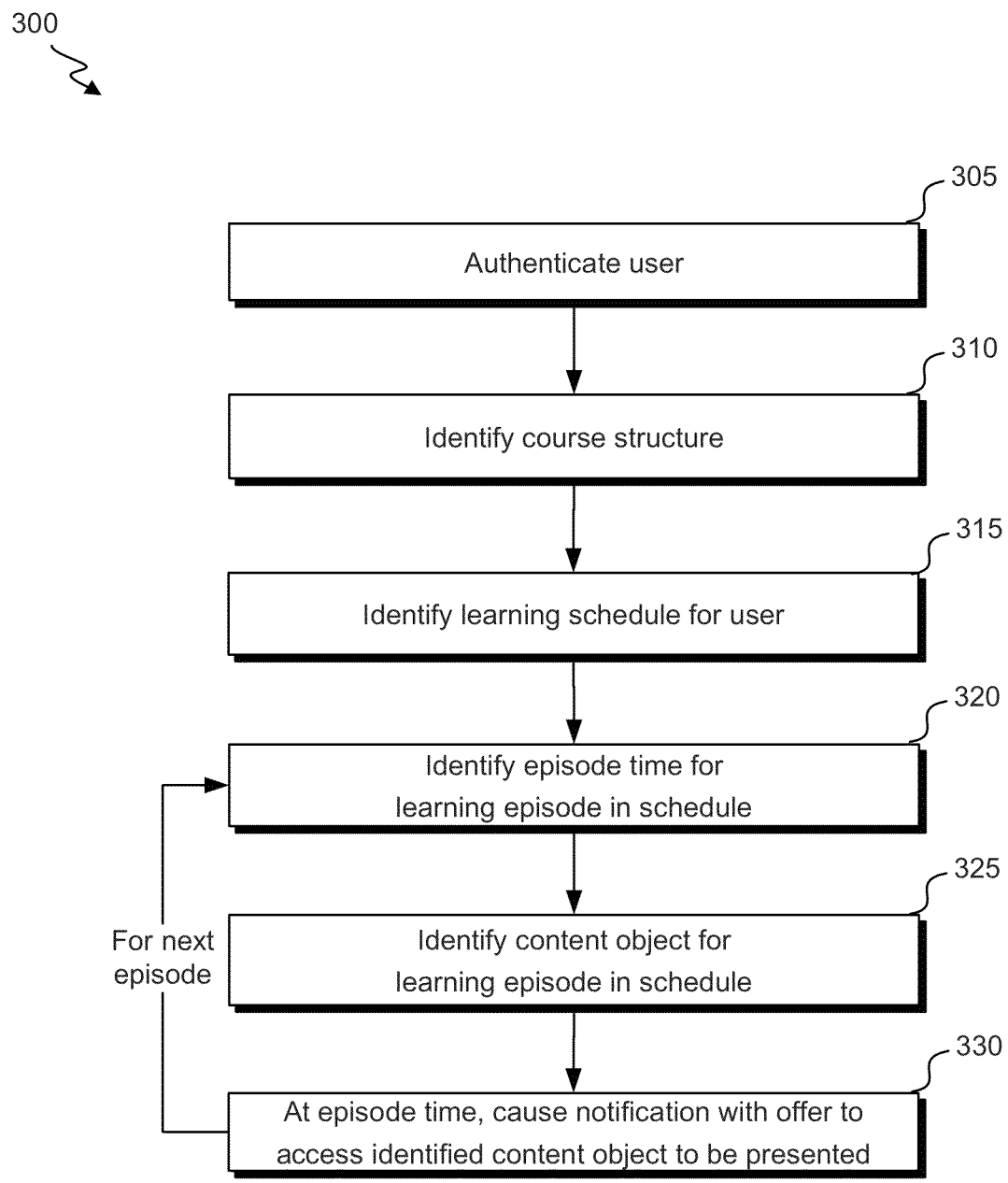
FIG. 3 illustrates a flowchart of an embodiment of a process for presenting learning-episode notifications based on a learning schedule.

FIG. 3 illustrates a flowchart of an embodiment of a process 300 for presenting learning-episode notifications based on a learning schedule. Process 300 can be performed, e.g., entirely on a user device, on a remote server, or on a combination thereof.

Process 300 begins at block 305 where account engine 205 authenticates a user. The authentication can include, for example, ensuring that a received login name and password match those for an account stored in account data store 210 and/or verifying that an attempted access is from a device identified in an account stored in account data store 210. In some instances, the authentication can include confirming that an input identified or selected identifies a name of an enrollee for a particular involvement (e.g., by scanning through one or more enrollee lists for particular involvement or for all involvements).

Content availer 220 identifies a course structure at block 310. The structure can correspond to an involvement (e.g., class) associated with the user. For example, account data for the user and stored in account data store 210 may identify an enrollment in a course (e.g., which may have initially been identified by the user, an instructor, an administrator, etc. As another example, a user may select or request to enroll in an in-person and/or virtual course, and the identified structure can be one for the course. A course may include a graded or ungraded course and/or may or may not be associated with a school (e.g., a high school or university). In one instance, the course includes or is a prep course for a standardized test (e.g., the SAT, GRE, LSAT, ACT, GMAT or MCAT) or a course to learn a language.

Content availer 220 can retrieve the identified structure from structure data store 225. The structure can include a list of tasks and/or requirements associated with the involvement (e.g., required to complete the involvement). For example, the structure can include one or more assignments (e.g., reading assignments, worksheet assignments, papers to write, projects, etc.) and/or assessments (e.g., exams, tests and/or quizzes). The structure can also include deadlines, dates and/or time periods for each of one or more structure elements (e.g., test dates, assignment deadlines, etc.).

Dynamic learning scheduler 225 identifies a learning schedule for the user at block 315. The learning schedule can include learning episodes. Each episode can be associated with an episode time and/or content object. The learning schedule can correspond to the structure, e.g., such that learning episodes and structure elements are directed to similar or same concepts.

Content availer 220 identifies an episode time for a learning episode identified in the learning schedule at block 325. In one instance, block 320 includes determining whether any learning episode (or any incomplete learning episode) is associated with an episode time matching a current time.

Content availer 220 identifies a content object based on the learning schedule at block 320. The content object can be associated with the episode time and/or a same learning episode as the episode time. The content object can be an electronic content object, a graded or ungraded assessment and/or reading material.

At the episode time, interface engine 215 can cause a notification to be presented on a device of the user. The notification can indicate that a content object for a learning episode is available for access. The notification can include text, a graphic, a sound, etc. The notification may, or may not, present information specific to a course or learning episode (e.g., identifying a course, content object, duration, concept, etc.). The notification may, or may not, include a selectable option that, if selected, would direct the user to a content object and/or an option to skip or postpone the learning episode.

Blocks 320-330 are then repeated for one or more other learning episodes in the schedule. During the performance of process 300, the learning schedule may be adjusted.

Figure 4A:
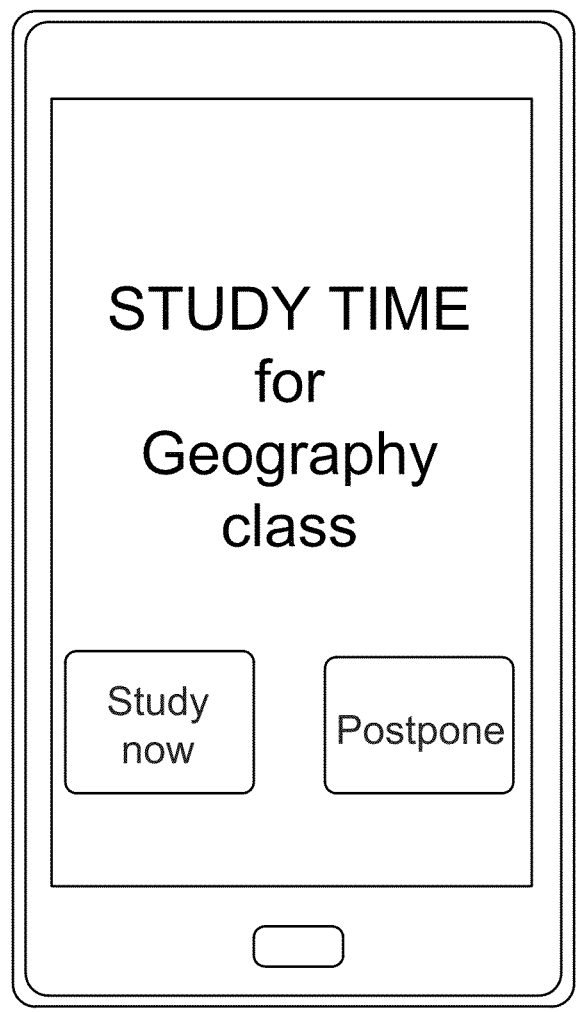
FIGS. 4A-4C illustrate representations of exemplary learning-episode notifications.
Figure 4B:
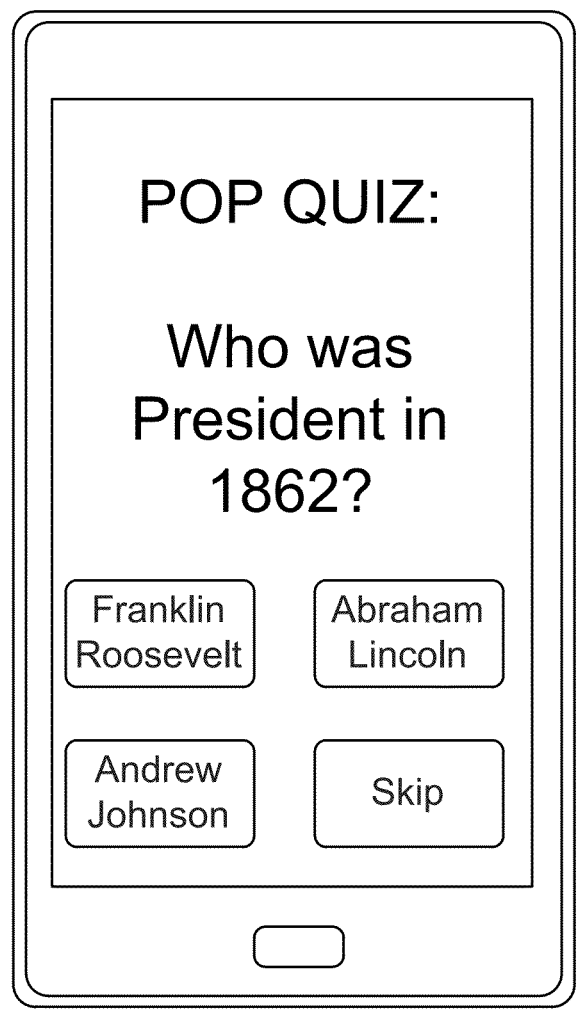
Figure 4C:
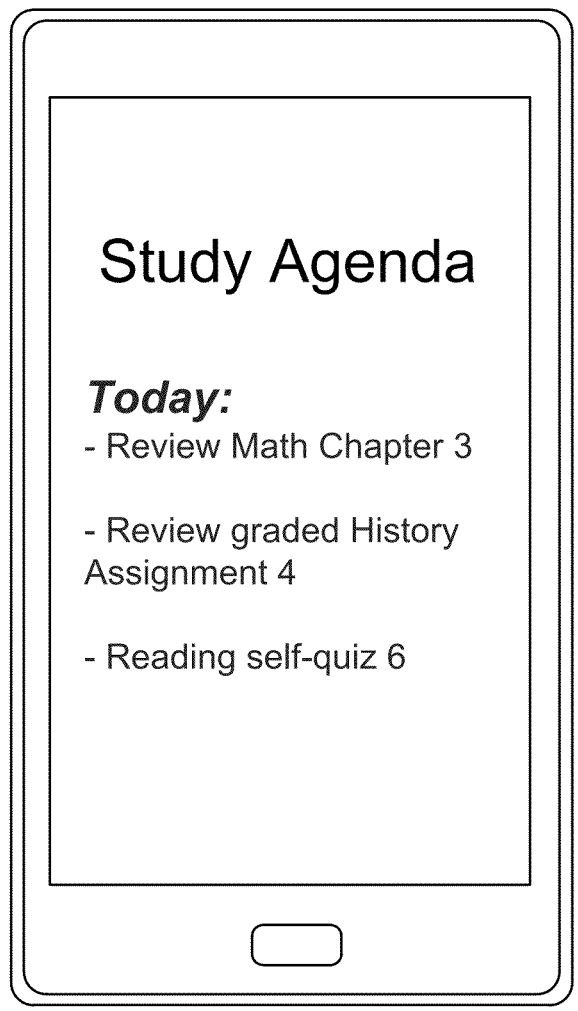

FIGS. 4A-4C illustrate representations of exemplary learning-episode notifications. Such representations may be presented on a user device at a presentation time automatically, when a user opens an educational app, etc.

The illustration shown in FIG. 4A alerts a user that it is a time for a scheduled learning episode. In this case, the notification identifies a specific class. It will be appreciated that various other degrees of information can be presented (e.g., not identifying a class, identifying a particular task for the learning episode, identifying an episode duration, etc.). The representation further provides options (buttons) for the user to indicate that she is requesting to begin the learning episode or is requesting for the episode to be postponed.

The illustration shown in FIG. 4B presents a part of a content object. In this instance, a history question is automatically presented at the presentation time (e.g., irrespective as to whether any user input requesting such content had been received recently or within a defined time period). Though this illustrate shows a portion of an assessment, other types of content objects may be presented. For example, educational text can be presented for user review. Answer options are also shown in the representation in FIG. 4B. Depending on the embodiment, the user's answer, user preferences and/or user-specific schedule, answering the question may or may not cause another question to be immediately presented.

The illustration shown in FIG. 4C includes a notification that is integrated into a study agenda. For example, an educational app may present a user with a study agenda (e.g., discretized in time units, such as days, weeks, hours, etc.) that identifies learning episodes for various learning schedules. This agenda may be automatically presented on a phone or may be presented upon receiving input corresponding to a request to view the agenda.

In some embodiments, the notification is presented via an app on an electronic device. In other embodiments, the notification can be presented via an email, a text message, a webpage and so on. Further, notifications can also or alternatively include audio notifications (e.g., tones indicating that a learning episode is scheduled to begin).

Figure 5:
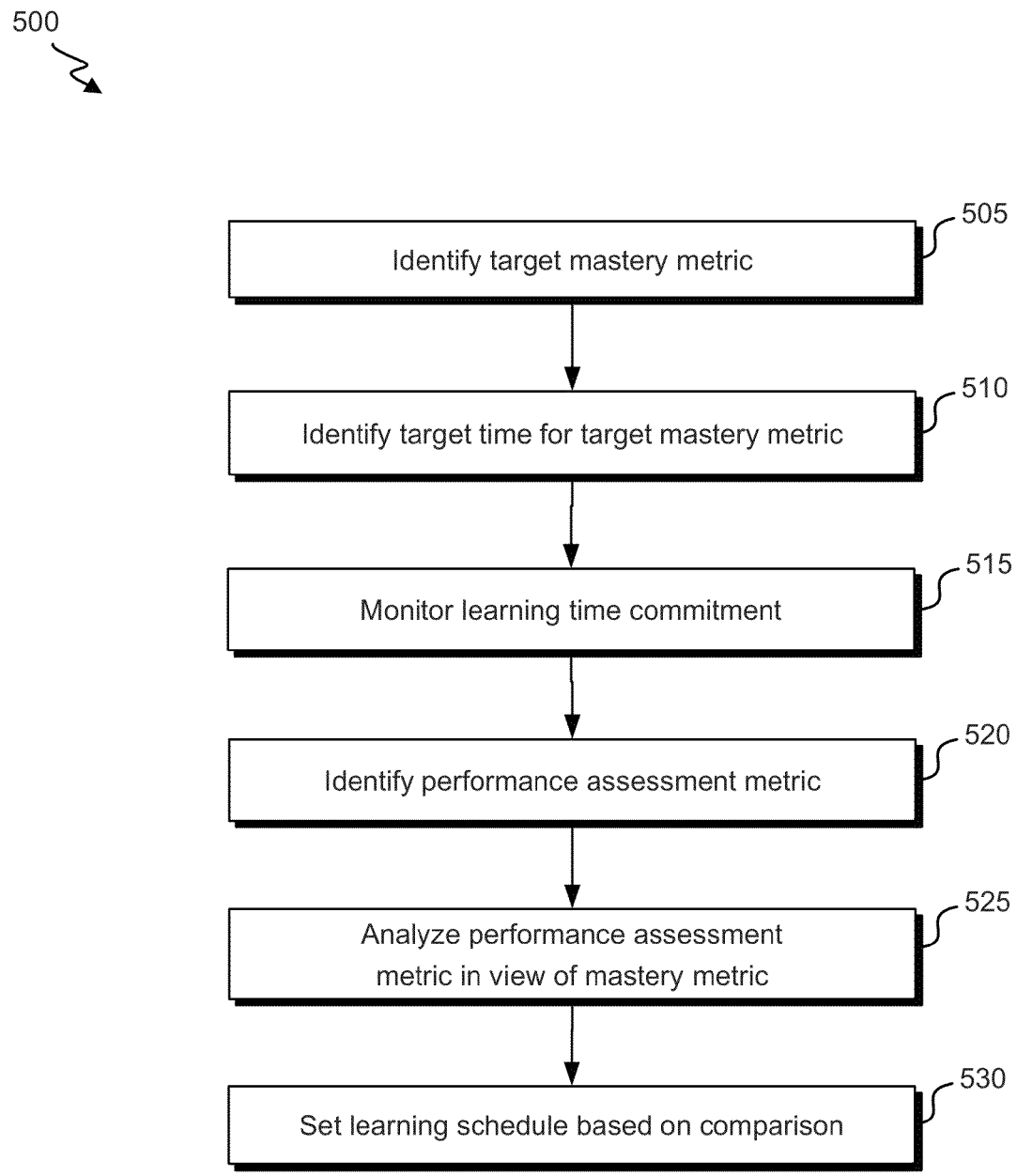
FIG. 5 illustrates a flowchart of an embodiment of a process for generating or modifying a learning schedule based on a performance metric.

FIG. 5 illustrates a flowchart of an embodiment of a process 500 for generating or modifying a learning schedule based on a performance metric. Process 500 can be performed, e.g., entirely on a user device, on a remote server, or on a combination thereof.

Process 500 begins at block 505 where dynamic learning scheduler 225 identifies a target mastery metric applicable to a course. The target mastery metric may be a target metric for a course (e.g., a target final course grade), a target metric for each of one or more intermediate course grades (e.g., a target course grade at one month into the course), a target metric for each of one or more assignments or assessments (e.g., quizzes or exams), a target grade or score associated with a non-course event (e.g., a standardized test or competition), etc. In some instances, multiple target mastery metrics applicable to a course are identified.

In some instances, the target mastery metric depends on input (e.g., identifying the target metric) provided by a user or instructor. In some instances, the target mastery metric is determined based on a user's current or past grades for other courses; a user's current or past grades for assignments and/or assessments for the course (or a rate of change thereof); other users' current or past course, assignment and/or assessment grades for the course. In some instances, the target mastery metric is set to a threshold for receiving a passing grade or an "A".

Dynamic learning scheduler 225 identifies a target time for reaching the target mastery metric at block 510. The target time may be absolute or functional. For example, the target time can be a calendar date, an assignment-completion date (e.g., whenever Assignment 1 is completed and graded) or a course-completion criterion (e.g., completion of a final exam, which may have pre-requisites for being taken). The target time can be identified based on input provided by a user, instructor, administrator, etc. or can be automatically determined (e.g., as a semester-end date).

At block 515, usage monitor 240 monitors a learning time commitment. The learning time commitment can include a number of times and/or a duration of time during which a user reported studying and/or was engaging in electronic studying (e.g., by completing assessment questions, accessing content objects, etc.). Exemplary learning time commitments include: completed 4 self-quizzes, completed all scheduled learning episodes, interacted with educational content for a total of 120 minutes, etc. The time commitment can, in some instances, be monitored on a course-specific basis (e.g., completed all scheduled Algebra tasks and 4 of 5 scheduled Spanish tasks).

Performance assessment engine 250 identifies a performance assessment metric for a user at block 520. The performance assessment metric can include or can be based on, for example, a grade received for an assessment or assignment, a time required to complete an assessment or assignment (or each of one or more individual questions in an assessment) and/or an input (e.g., by an instructor, administrator or user) identifying a grade. The performance assessment metric can be based on or can include, for example, an overall current course grade or a grade for a particular assignment or assessment. In some instances, the performance assessment metric corresponds to a same course as does the target mastery metric and or a learning schedule being set. In some instances, the performance assessment metric alternatively or additionally corresponds to a different course (e.g., another course in which a user is currently enrolled).

Dynamic learning scheduler 225 analyzes the performance assessment metric in view of the target mastery metric at block 525. The analysis can include, for example, performing a comparison (e.g., determining whether the performance assessment metric is less than the target mastery metric), calculating a ratio (e.g., of the identified metric relative to the target metric), and/or calculating a difference (e.g., between the identified and target metrics). In some instances, the analysis is predictive. For example, a modeling or extrapolation technique can be used to generate a predicted metric which can then be assessed relative to the target metric, in a manner such as one described above. In some instances, the analysis depends on corresponding performance assessment metrics for other users. Thus, for example, a target mastery metric may be defined as being within a top 10% in a class. The analysis can then determine a class percentile ranking using performance assessment metrics for users in the class.

This analysis can also use the target time identified at block 510. To illustrate, for an SAT prep course, a user may have set a target score as 1500, and performance assessment metrics can be periodically collected during the course. A given metric may indicate that the user received a 1300 score on a practice test. If a target time for reliably achieving the target score is in the near future (e.g., within a week or two), the schedule may be adjusted to include more and/or longer learning episodes than it would if the target time was in the more distant future.

Dynamic learning scheduler 225 sets a learning schedule based on the analysis at block 530. Setting a learning schedule can include adjusting a defined learning schedule (e.g., specific to the user or a default schedule) or generating a new learning schedule. One or more characteristics of the learning schedule (e.g., a number or frequency of learning episodes, a duration of one or more learning episodes, a skill level for one or more learning episodes, a task for one or more learning episodes, a content object or other substance for one or more learning episodes, etc.) can be set based on the analysis performed at block 525.

It will be appreciated that various modifications of process 500 are contemplated. For example, in some instances, the analysis performed at block 525 can further or alternatively analyze the time commitment identified at block 515. To illustrate, if a user frequently engages in learning episodes but frequently terminates the episode prior to completion, the assessment metric may reflect this engagement characteristic, and the learning schedule can be adjusted to reduce learning episodes' duration but increase their number. As another example, block 515 may be omitted from process 500.

FIGS. 6A-6B illustrate representations of exemplary schedules. As shown, tables are used to represent the schedules. Each row corresponds to a learning episode, and the first column shows a substance or task without learning episode. In these tables, each learning episode involves review or completion of a content object. Further, a duration is identified for some of the learning episodes, which indicates how long a learning episode is to be. As shown, the duration can be a temporal time, a threshold performance metric or threshold completion. Each learning episode is also associated with the presentation time, which can indicate when the learning episode is to be made available and/or when a user is to be notified of the learning episode.

In this illustrated example, the schedule represented in FIG. 6B is a modified version of the schedule represented in FIG. 6A. This modification occurred in response to analyzing the performance metric, which was a completion time, for Self-Quiz A. Completion time was determined to be above a threshold, which may indicate that the user does not possess a desired understanding. Accordingly, this particular schedule is adjusted to increase the number of learning episodes and to increase a completion accuracy score for self quizzes.

It will be appreciated that the representation of the schedules is illustrative, as are the fields in the schedule. In other embodiments, schedules can include fewer, additional or different fields, such as a skill level, a requirement indicator, etc. Further, it will be appreciated that a learning episode can include various numbers of tasks to perform, which may reference various numbers of content objects. Users may also be allowed to select between tasks for a given learning episode.

Representations of schedules may be presented to users (automatically or upon request) or hidden. In some instances, schedules may be modifiable. For example, a user or instructor may view representation of the schedule and adjusted to, e.g., add, remove or modify learning episodes. Further, schedules can be generated to conform to constraints and/or preferences as identified by users and/or instructors. The constraints and/or preferences can identify preferred or unpreferred task types, content-object types, presentation times, learning-episode numbers or frequencies, difficulty level, etc.

Figure 7A:
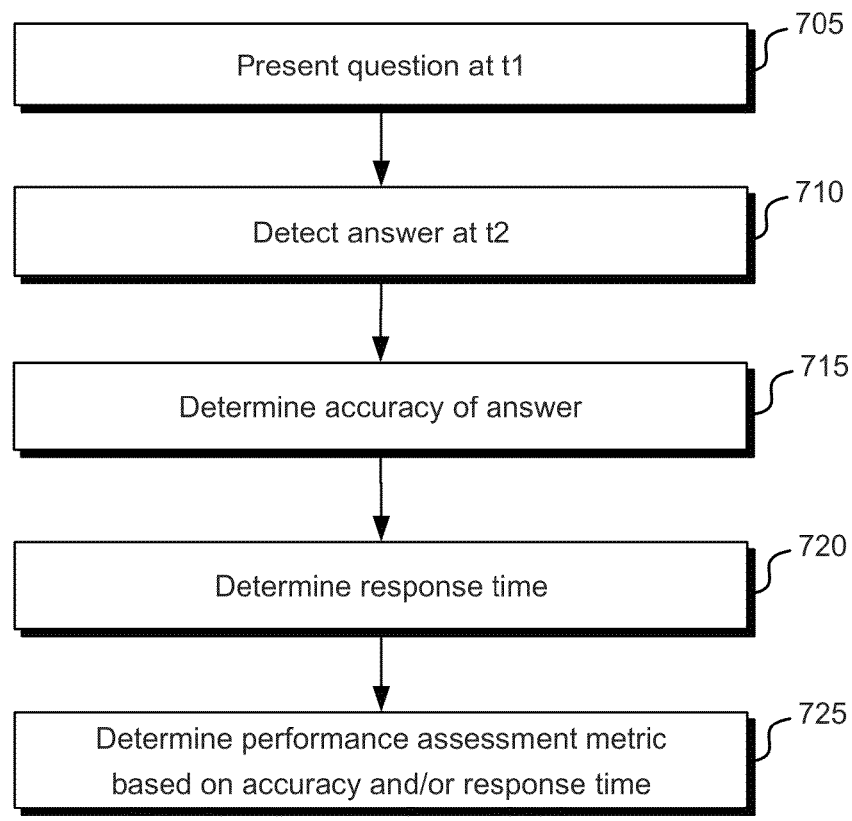
FIG. 7A illustrates a flowchart of an embodiment of a process for determining a performance metric based on response times.

FIG. 7A illustrates a flowchart of an embodiment of a process 700a for determining a performance metric based on response times. Process 700a begins at block 705 where content availer 220 causes a question to be presented to a user (e.g., by presenting the questioning on a screen of a user device or via speakers of a user device) at a first time, t1. The question can be a question from the assessment content object. The question may be presented, for example, as part of a learning episode or as part of a course assessment (e.g. the required tester quiz). The question may, or may not, be one that will influence course grade for the user.

Content availer 220 can cause a question to be presented by causing interface engine 215 to present the question on a user device. In one instance, block 705 merely detects presentation of a question rather than causing it to be presented. For example, an instructor can enter input indicating that she verbally communicated a question at a particular time to students in a classroom.

In some instances the question may be lengthy, such that there is a considerable time delay between the time at which the beginning of a question is presented in the time at which the end of the question is presented. For example, an assessment can provide a page-long essay can then ask a reading comprehension question. As another example, a word problem may be several paragraphs long. The first time, t1, can be defined as the time at which the beginning of the question was presented or as the time at which the end of the question was presented (e.g., was visible on the screen).

At block 710, performance assessment engine 250 detects that a user submitted an answer to the question at a second time, t2. The answer submission can include, for example, selecting an answer option or selecting a submit button (e.g., after selecting an answer option or typing the short answer or essay).

Performance assessment engine 250 determines an accuracy of the answer at block 715. The accuracy can be determined by comparing the answer to one in an electronic key or to one provided by an instructor or administrator. For example, the teacher may indicate that she posed a question to a class that the correct answer is "A". In some instances, determining the accuracy includes receiving an input identifying a manual score or grade for the question.

Performance assessment engine 250 determines a response time for submitting the answer block 720. The response time can be defined as the time between t2 and t1.

At block 725, performance assessment engine 250 determines a performance assessment metric based on accuracy and/or response time. The metric may itself be the accuracy or the response time, or a function or technique can be used to determine the metric based on one or both of the accuracy and response time. The metric may be on a continuous or discrete scale and may be numeric or non-numeric (e.g., may be a category). Determining the metric can include determining whether one or both of the accuracy and response time were above or below a respective threshold, performing a categorization, evaluating an if-function, calculating a weighted variable, etc.

Process 700a is disclosed to pertain to presentation of a single question and analysis of a response to the question. It will be appreciated that the variance of process 700, however, can relate to multiple questions. For example, a set of questions (e.g., a quiz) can be cause to be presented at block 705. At block 710, response times can be detected for individual questions in the set or can be detected that a user has answered all the questions or submitted their responses to the questions. The accuracy determined at block 715 and/or this determined at block 720 can be determined on a question-specific basis or overall across the set. For example, a single metric for a quiz be determined based on accuracy of answers for each question and a total time required to complete the quiz.

In some instances, process 700a can be performed partly or fully on a user device. It will be appreciated that, in some instances, part or all of process 700 are presented on another device.

Figure 7B:
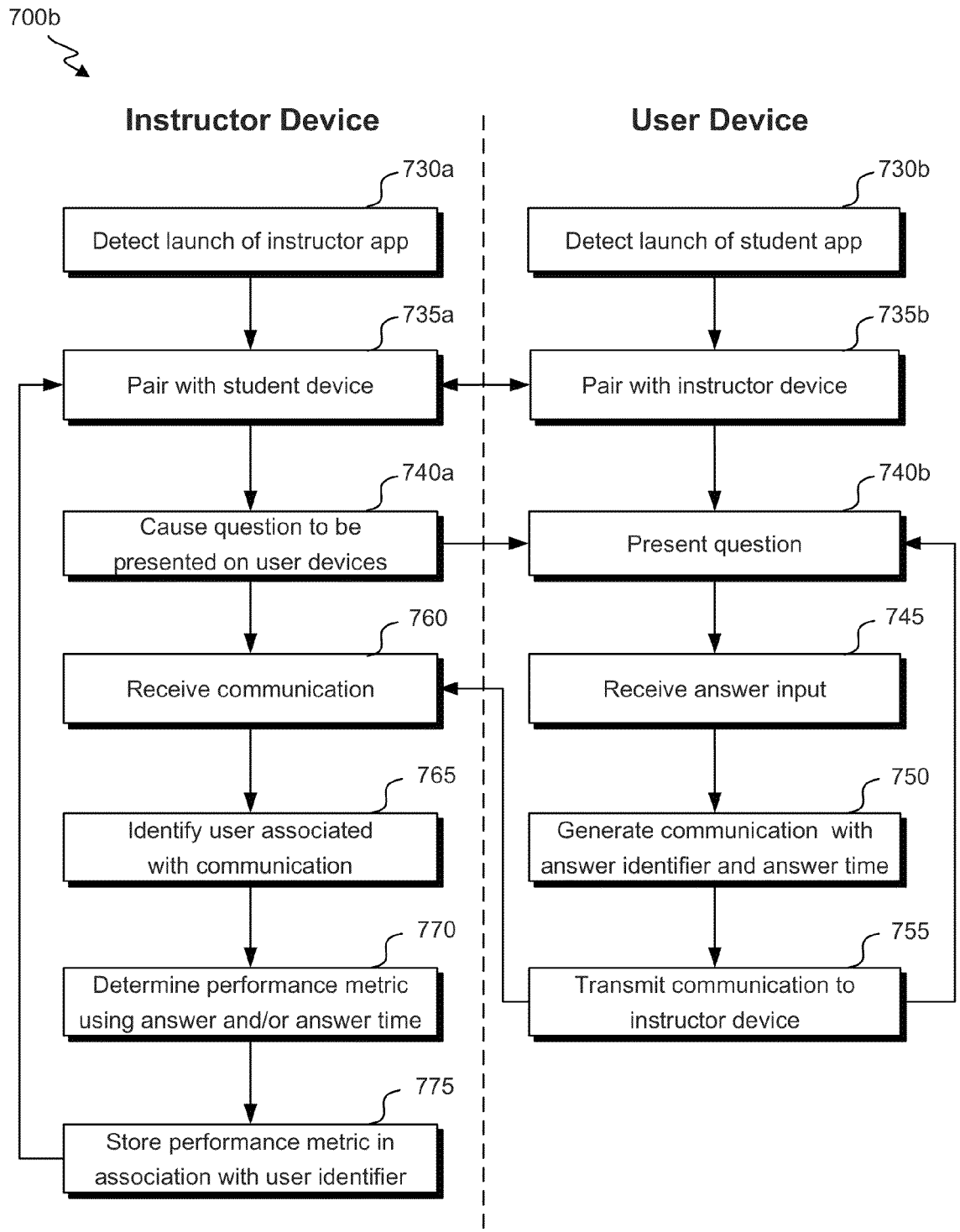
FIG. 7B illustrates a flowchart of an embodiment of a process for determining a performance metric using multiple devices.

FIG. 7B illustrates a flowchart of an embodiment of a process 700b for determining a performance metric using multiple devices. Process 700b illustrates a process involving one instructor device and one user device, though it will be appreciated that the process can be expanded to other or more devices (e.g., such that a single instructor device can communicate with multiple user devices).

Process 700b begins at blocks 730a and 730b where an instructor device and a user device respectively detect a launch of an instructor app and a student app. At blocks 735a and 735b, the student device is paired with (or otherwise establishes a communication channel with) the instructor device. For example, a pair request can be sent automatically or in response to receiving instructor input from the instructor device to nearby devices and/or to devices associated with users enrolled in the instructor's course. As another example, users may enter a code on their devices to establish the pairing.

At block 740a, an instructor device causes a question to be presented on the user device. Block 740a can include transmitting a question communication to the user device that includes the question (e.g., and may include a presentation time).

In instances where process 700b relates to a diverging communication network between one instructor device and multiple user devices, the question may or may not be caused to be simultaneously presented on the multiple user devices and/or the question may or may not be the same across user devices. The question can be one provided in real-time via input from the instructor, one selected from the instructor, one identified in a course structure, etc. The question may include a set of answer choices, and the instructor may, in some instances, further identify a correct answer choice. At block 740b, the question is then presented on the user device.

At block 745, the user device receives input from the user, the input corresponding to an answer. The input can be received at an answer time. The input can include a selection of an answer choice, a short answer, an essay, etc. In one instance, an answer is detected as soon as an answer input is provided. In one instance, an answer is detected upon a submission indication for the answer. In some instances, a lack of an answer input is considered to be an answer.

At block 750, a communication is generated that includes an identifier of the answer and an answer time. The answer identifier can include, e.g., the answer itself, an indication as to whether (and/or a degree to which) the answer was correct. The answer time can include, for example, a time corresponding to a time of receipt of the input, a time at which the communication was generated, or a time period, such as a time period between the receipt time (or communication-generation time) and a time of the question presentation. In some instances, the communication does not identify the answer time (e.g., and an instructor device can estimate the answer time based on a time at which the communication was received from the user device).

The communication can be transmitted to the instructor device at block 755 (e.g., immediately upon generation, at a scheduled transmission time or upon a request from the instructor device) and can be received at the instructor device at block 760.

The instructor device can identify a user or user characteristic associated with the communication at block 765. Such information can be determined using a content of the communication (e.g., which may include a name of a user, a characteristic of a user or a device identifier).

At block 770, a performance metric can be determined using the answer identifier and/or answer time. In some instances, the instructor device uses the answer time along with data indicating when the question was caused to be presented to identify a response time for the user. The instructor device can, in some instances, store the performance metric in association with an identifier for the user. As described further herein, performance metrics for multiple users can be aggregated and/or processed, and a representation thereof can be presented on the instructor device.

While process 700b illustrates one example for which multiple devices can communicate to convey performance-relevant information, other types of interactions are contemplated as well. For example, a server could perform one or more of the blocks identified as being performed an instructor device, the user device may determine the performance metric, etc.

Figure 8:
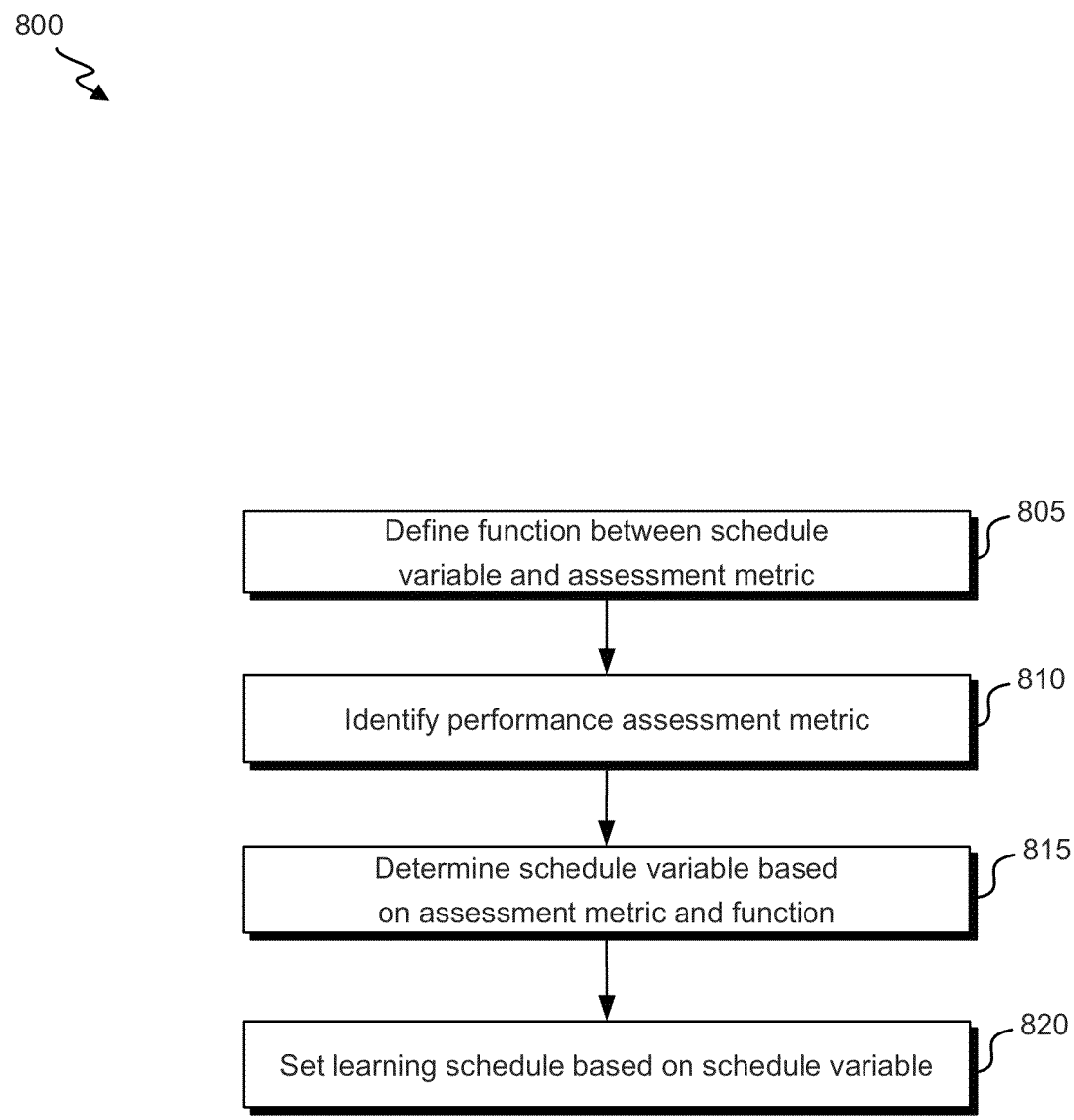
FIG. 8 illustrates a flowchart of an embodiment of a process for generating or modifying a learning schedule based on a performance metric.

FIG. 8 illustrates a flowchart of an embodiment of a process 800 for generating or modifying a learning schedule based on a performance metric. Process 800 can be performed partly or fully on: a user device, an instructor device and/or a central server.

Process 800 begins at block 805 where dynamic learning scheduler 225 defines function between a schedule variable and a performance assessment metric. The schedule variable can include a number or frequency of learning episodes, a difficulty of learning episodes, a duration for one or more learning episodes, a type of task to present in one or more learning episodes, a review variable indicating an extent to which learning episodes are to focus on newly learned material versus reviewing older material, etc. It will be appreciated that, in some instances, the function provides multiple schedules variables.

The function can include any equation or technique that can receive as input one or more performance assessment metrics and produce as output the schedule variable. In some instances, the function is an equation. In some instances, the function includes a flowchart and/or one or more conditions. In some instances, evaluation of the function includes performing a modeling or classification technique.

One or more variables or other characteristics of the function may, in some instances, differ across courses, instructors, users, schools, etc. For example, each instructor may be able to identify definitions for various performance groups, for each group is to be associated with a different type of learning schedule.

Performance assessment engine 250 identifies performance assessment metric at block 810. The performance assessment metric can be a current or past course grade and/or a metric determined based on one or more answers provided responsive to one or more assessments.

At block 815, dynamic learning scheduler 225 determines a schedule variable based on the performance assessment metric and the function.

Dynamic learning scheduler 225 sets a learning schedule based on schedule variable at block 820. Setting the schedule can include generating a new schedule or adjusting a default or previously generated schedule. The adjustment can be specific to a user or specific to a course.

Figure 9:
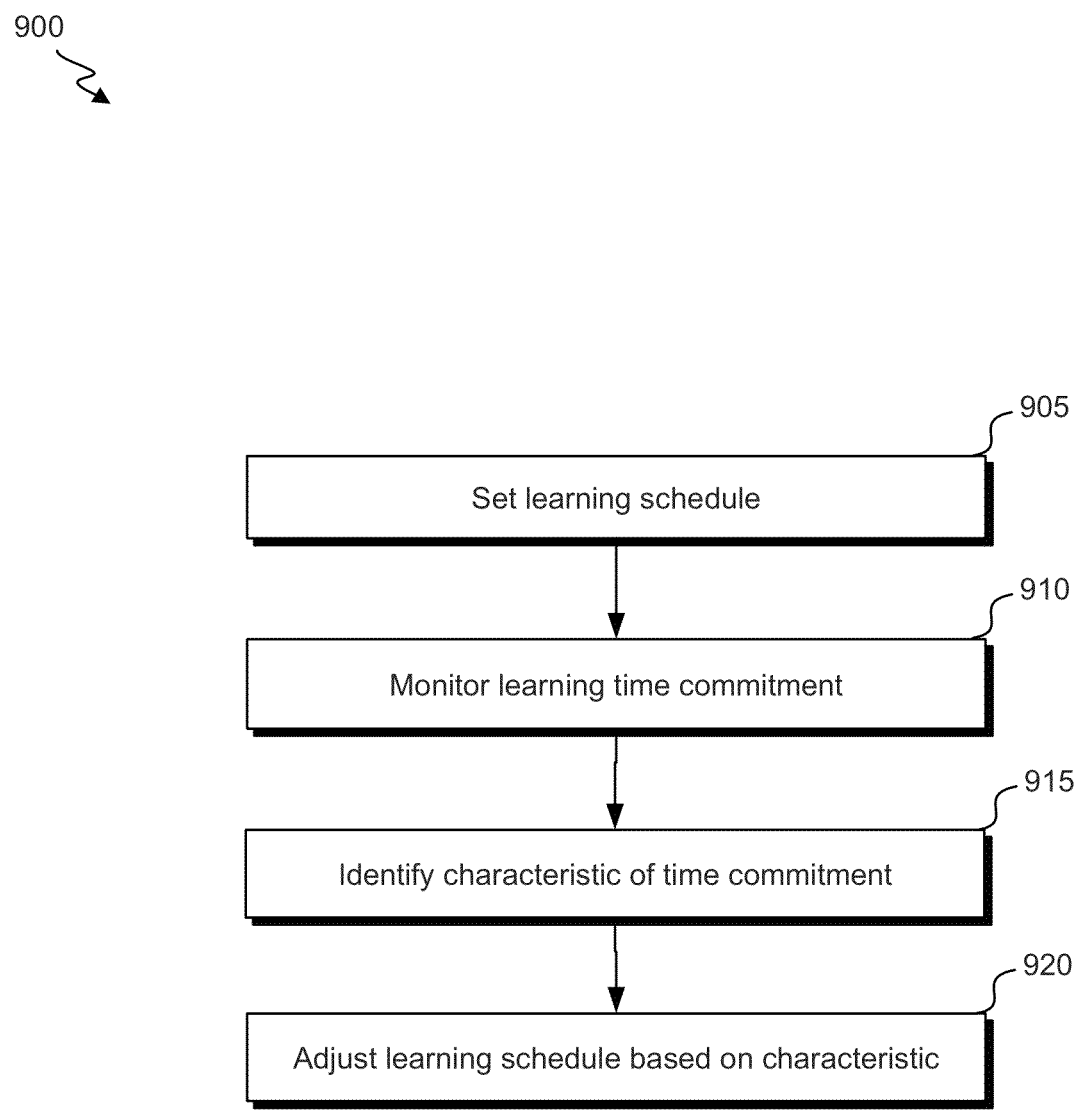
FIG. 9 illustrates a flowchart of an embodiment of a process for generating or modifying a learning schedule based on a learning time commitment.

FIG. 9 illustrates a flowchart of an embodiment of a process 900 for generating or modifying a learning schedule based on a learning time commitment. Process 900 can be performed partly or fully on: a user device, an instructor device and/or a central server.

Process 900 begins at block 905 where dynamic learning scheduler 225 sets a learning schedule for a user. The learning schedule can be set using a technique described herein. For example, the learning schedule can be set to a default schedule for a course and/or can be set based on one or more performance metrics associated with the user.

Usage monitor 240 monitors a learning time commitment for the user at block 910. This analysis may or may not be specific to a course. For example, usage monitor 240 can detect which days of the week and/or times of day a user engaged in learning episode. Monitoring can also include detecting when learning episodes were scheduled to occur and/or when notifications pertaining to learning episodes were presented to a user. Monitoring can include determining a time period during which a user engaged in a learning episode. Monitoring can include identifying which tasks or types of tasks a user engaged in and/or which content objects and/or types of objects a user accessed.

Usage monitor 240 identifies a characteristic of the time commitment at block 915. The characteristic can be indicative of, for example, a day or time that a user is likely (or is unlikely) to engage in learning episode. The characteristic can be indicative of a type of task that the user is likely (or is unlikely) to engage in, a type of content object that the user is likely (or is unlikely) to access, The characteristic can be indicative of a duration that the user is likely (or is unlikely) to devote for a learning episode.

At block 920, dynamic learning scheduler 225 adjusts the learning schedule based on the characteristic. For example, new learning episodes may be scheduled and/or existing learning episodes may be moved to days and times associated with higher frequency engagement. As another example, new learning episodes may be generated and/or existing learning episodes may be adjusted to correspond to tasks or content objects associated with higher frequency engagement. As yet another example, new learning episodes may be generated and/or existing learning episodes may be adjusted to have a duration similar to the characteristic. To illustrate, if an initial schedule includes 3 weekly learning episodes each of 30-minute duration, and if the user engages in each episode but only for 15 minutes, the schedule may be adjusted to instead include 6 weekly learning episodes each of 15-minute duration.

Figure 10:
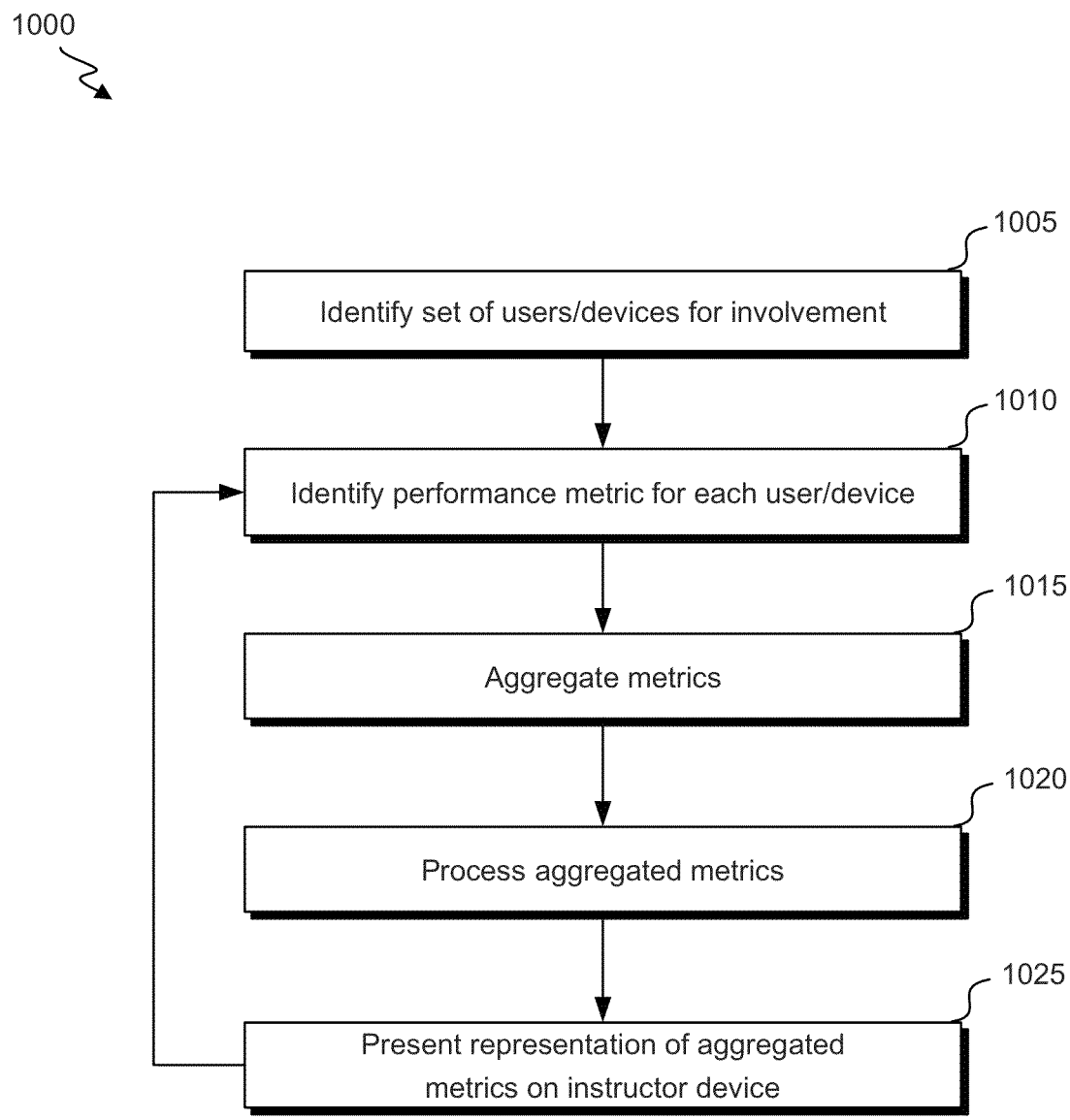
FIG. 10 illustrates a flowchart of an embodiment of a process for aggregating learning performance metrics.

FIG. 10 illustrates a flowchart of an embodiment of a process 1000 for aggregating learning performance metrics. Process 1000 begins at block 1005 where aggregator 260 identifies a set of users or user devices for an involvement. The set of users can include, for example, include those currently enrolled in a course or physically present in a physical or virtual classroom.

Performance assessment engine 250 identifies one or more performance assessment metrics for each user/device at block

1010. The one or more performance assessment metrics may be determined, e.g., as in process 700 and/or may depend on an accuracy and/or response time of a response to a question. For example, an instructor may present a question verbally, electronically or visually (e.g., using a projector), and the performance assessment metric may be determined for each user based on a response electronically submitted for the question. Such responses may be transmitted to a central (e.g., remote) server or to an instructor device to determine the performance assessment metric.

Aggregator 260 aggregates the performance assessment metrics at block 1015. In one instance, all metrics are aggregated. In one instance, one or more selective aggregations are performed. For example, one or more subsets of the set can be identified based on, for example, a user characteristic (e.g., grade level), a past user performance metric (e.g., a current course grade), or a current performance metric (e.g., a provided answer or answer accuracy). In one instance, an instructor or administrator provides input defining each of one or more subsets (e.g., individually identifying users in each of one or more subsets or identifying a subset characteristic).

Aggregator 260 processes the aggregated performance assessment metrics at block 1020. Processing can include generating one or more statistics, generating a distribution, generating a table, identifying outliers, (e.g., outlier users), etc. In some instances, processing is performed in view of one or more response-time thresholds and/or response-time dta for other one or more other questions. For example, the processing can determine how a variable associated with a response time for a given question (e.g., an average response time) compared to a threshold or variable based on response times for other questions (e.g., to identify a response-time difference or to determine whether the question was associated with an absolutely or relatively long response-time variable).

Interface engine 215 presents a representation of the processed metrics on an instructor device at block 1025. The representation can include, for example an identification of a question or an assessment corresponding to the identified performance metric (e.g., including an entire question or a mere identifier), a portion of the set of users represented in the representation, and/or an indication of a correct response.

It will be appreciated that various portions of process 1000 can be performed on, for example, a central server (e.g., a remote server) or an instructor device. For example, process 1000 in its entirety be performed on an instructor device. As another example, blocks 1005-1020 can be performed on a central server, and the process metrics or representation of the process metrics can be transmitted to an instructor device, such that block 1005 can be form instructor device.

Figure 11A:
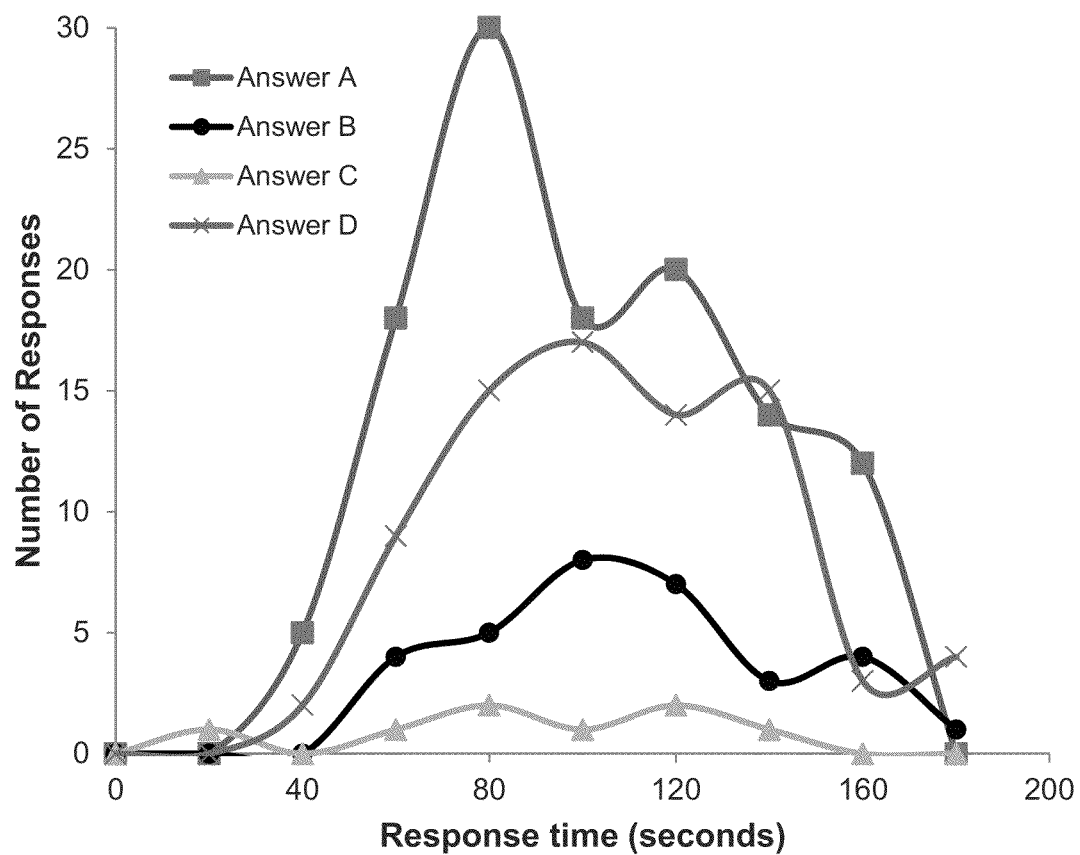

FIGS. 11A-11B illustrate representations of aggregated metrics. In both figures, the metric represented is a response time. Selective aggregation is performed based on a provided answer type. In FIG. 11A, a set of responses is first divided into four groups based on which, of four, answers was selected by the user. For each group, a distribution of response times is generated and graphically shown. Thus, most users selected "A" as the answer. Many users also rapidly selected this answer. The graph shows, however, that there was considerable variation in response time, and that answer "D" was also a common selection.

In FIG. 11B, a table shows representations of processed metrics for each of a set of 10 questions. For each question, a set of responses is first separated into two groups with one group corresponding to a "correct" answer choice and the other corresponding to all other answer selections. For each group, the table identifies an average response time for sub-mitting the answer. In this illustration, the average response times for correct answers were shorter than average response times for incorrect answer. Further, some questions (e.g., questions 6) were associated with substantially longer response times than for other questions (e.g., question 8). This may indicate that question 8 was more challenging for the students as compared to question 6. In some instances, response times can be processed to identify one or more (e.g., a threshold number) of questions associated with long (e.g., average, median, maximum) or variable response times, which may indicate a relatively poor understanding. Identifications of corresponding questions can be presented in a notification.

Figure 12:
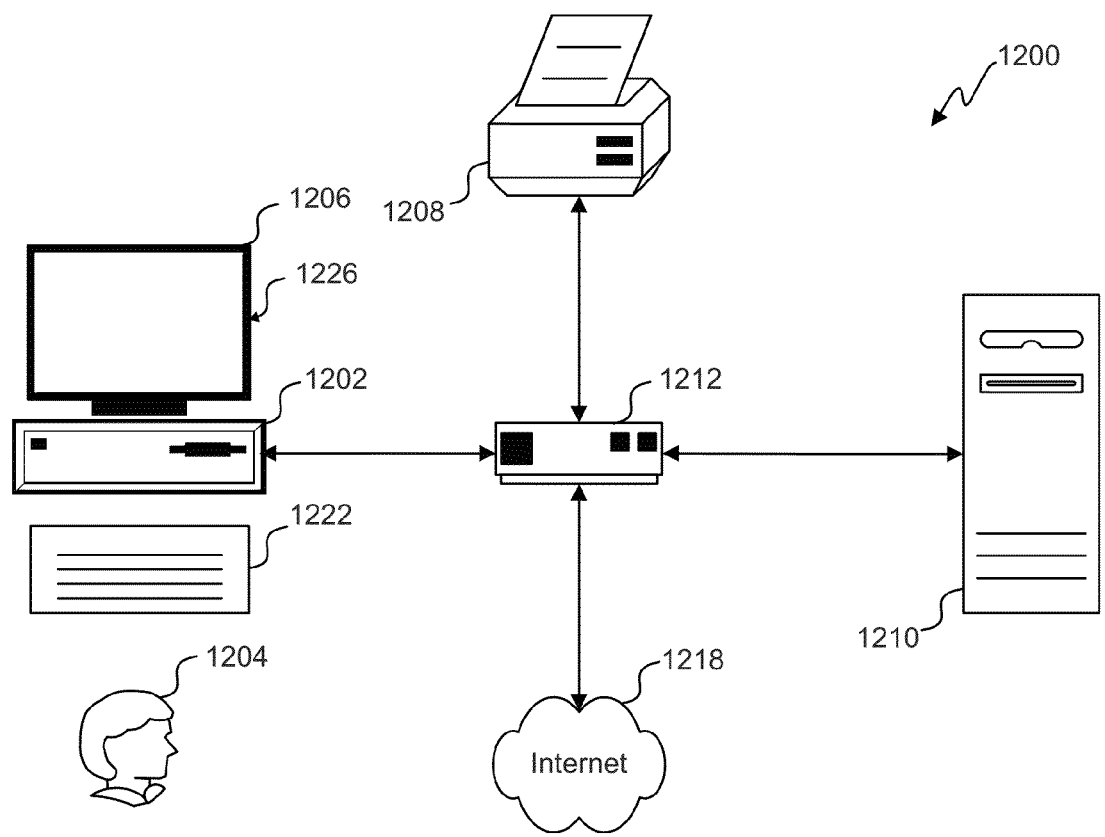
FIG. 12 depicts a block diagram of an embodiment of a computer system.

Referring next to FIG. 12, an exemplary environment with which embodiments can be implemented is shown with a computer system 1200 that can be used by a designer 1204 to design, for example, electronic designs. The computer system 1200 can include a computer 1202, keyboard 1222, a network router 1212, a printer 1208, and a monitor 1206. The monitor 1206, processor 1202 and keyboard 1222 are part of a computer system 1226, which can be a laptop computer, desktop computer, handheld computer, mainframe computer, etc. Monitor 1206 can be a CRT, flat screen, etc.

A designer 1204 can input commands into computer 1202 using various input devices, such as a mouse, keyboard 1222, track ball, touch screen, etc. If the computer system 1200 comprises a mainframe, a designer 1204 can access computer 1202 using, for example, a terminal or terminal interface. Additionally, computer system 1226 can be connected to a printer 1208 and a server 1210 using a network router 1212, which can connect to the Internet 1218 or a WAN.

Server 1210 can, for example, be used to store additional software programs and data. In one embodiment, software implementing the systems and methods described herein can be stored on a storage medium in server 1210. Thus, the software can be run from the storage medium in server 1210. In another embodiment, software implementing the systems and methods described herein can be stored on a storage medium in computer 1202. Thus, the software can be run from the storage medium in computer system 1226. Therefore, in this embodiment, the software can be used whether or not computer 1202 is connected to network router 1212. Printer 1208 can be connected directly to computer 1202, in which case, computer system 1226 can print whether or not it is connected to network router 1212.

Figure 13:
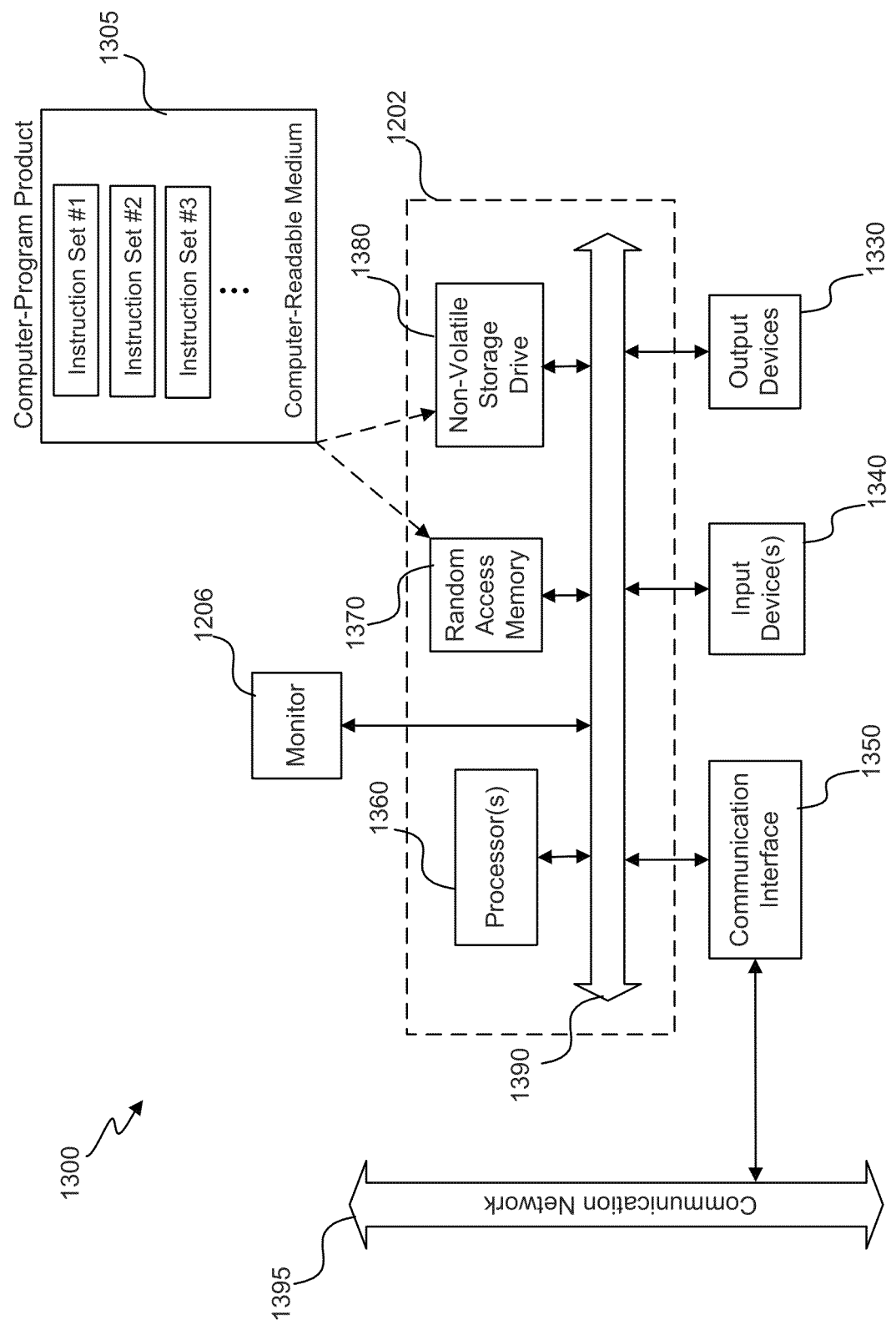
FIG. 13 depicts a block diagram of an embodiment of a special-purpose computer system.

With reference to FIG. 13, an embodiment of a special-purpose computer system 1300 is shown. Education-app engine 150 and/or any components thereof are examples of a special-purpose computer system 1300. Thus, for example, one or more special-purpose computer systems 1300 can be used to provide the function of education-app engine 150. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 1226, it is transformed into the special-purpose computer system 1300.

Special-purpose computer system 1300 comprises a computer 1202, a monitor 1206 coupled to computer 1202, one or more additional user output devices 1340 (optional) coupled to computer 1202, one or more user input devices 1335 (e.g., keyboard, mouse, track ball, touch screen) coupled to computer 1202, an optional communications interface 1355 coupled to computer 1202, a computer-program product 1305 stored in a tangible computer-readable memory in computer 1202. Computer-program product 1305 directs system 1300 to perform the above-described methods. Computer 1202 can include one or more processors 1360 that communicate with a number of peripheral devices via a bus subsystem 1390. These peripheral devices can include user output device(s) 1340, user input device(s) 1335, communications interface 1355, and a storage subsystem, such as random access memory (RAM) 1370 and non-volatile storage drive 1380 (e.g., disk drive, optical drive, solid state drive), which are forms of tangible computer-readable memory.

Computer-program product 1305 can be stored in non-volatile storage drive 1390 or another computer-readable medium accessible to computer 1202 and loaded into memory 1370. Each processor 1360 can comprise a microprocessor, such as a microprocessor from Intel® or Advanced Micro Devices, Inc®, or the like. To support computer-program product 1305, the computer 1202 runs an operating system that handles the communications of product 1305 with the above-noted components, as well as the communications between the above-noted components in support of the computer-program product 1305. Exemplary operating systems include Windows® or the like from Microsoft Corporation, Solaris® from Sun Microsystems, LINUX, UNIX, and the like.

User input devices 1335 include all possible types of devices and mechanisms to input information to computer system 1202. These can include a keyboard, a keypad, a mouse, a scanner, a digital drawing pad, a touch screen incorporated into the display, audio input devices such as voice recognition systems, microphones, and other types of input devices. In various embodiments, user input devices 1335 are typically embodied as a computer mouse, a trackball, a track pad, a joystick, wireless remote, a drawing tablet, a voice command system. User input devices 1335 typically allow a user to select objects, icons, text and the like that appear on the monitor 1206 via a command such as a click of a button or the like. User output devices 1340 include all possible types of devices and mechanisms to output information from computer 1202. These can include a display (e.g., monitor 1206), printers, non-visual displays such as audio output devices, etc.

Communications interface 1355 provides an interface to other communication networks and devices and can serve as an interface to receive data from and transmit data to other systems, WANs and/or the Internet 1218. Embodiments of communications interface 1355 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1355 can be coupled to a computer network, to a FireWire® bus, or the like. In other embodiments, communications interface 1355 can be physically integrated on the motherboard of computer 1202, and/or can be a software program, or the like.

RAM 1370 and non-volatile storage drive 1380 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1370 and non-volatile storage drive 1380 can be configured to store the basic programming and data constructs that provide the functionality of various embodiments of the present invention, as described above.

Software instruction sets that provide the functionality of the present invention can be stored in RAM 1370 and non-volatile storage drive 1380. These instruction sets or code can be executed by processor(s) 1360. RAM 1370 and non-volatile storage drive 1380 can also provide a repository to store data and data structures used in accordance with the present invention. RAM 1370 and non-volatile storage drive 1380 can include a number of memories including a main random access memory (RAM) to store of instructions and data during program execution and a read-only memory (ROM) in which fixed instructions are stored. RAM 1370 and non-volatile storage drive 1380 can include a file storage subsystem providing persistent (non-volatile) storage of program and/or data files. RAM 1370 and non-volatile storage drive 1380 can also include removable storage systems, such as removable flash memory.

Bus subsystem 1390 provides a mechanism to allow the various components and subsystems of computer 1202 communicate with each other as intended. Although bus subsystem 1390 is shown schematically as a single bus, alternative embodiments of the bus subsystem can utilize multiple busses or communication paths within computer 1202.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. An educational-app system for dynamically setting user-specific schedules, the educational-app system comprising:
    a performance assessment engine that identifies:
        an educational performance metric reflecting a past educational performance of a user enrolled in a class based on one or more first inputs; and
        one or more corresponding educational performance metrics reflecting a past educational performance of other students enrolled in the class based on one or more second inputs;
    a dynamic learning scheduler that includes one or more processors and that:
        identifies a target time for providing at least one response to one or more questions;
        accesses a learning schedule, the learning schedule including an identification of a plurality of learning episodes, each of the plurality of learning episodes being associated with a time-related variable indicative of when the learning episode is to occur and a substance-related variable indicative of a learning substance for the learning episode; and
        adjusts the learning schedule based on:
            the identified educational performance metric reflecting the past educational performance of the user enrolled in the class;
            the one or more corresponding educational performance metrics reflecting the past educational performance of other students enrolled in the class;
            the target time; and
            a target mastery metric;
            wherein the adjusted learning schedule is associated with the user;
    a content availer that:
        automatically identifies a first presentation time based on a time-related variable in the learning schedule;
        automatically identifies an electronic content object associated with the presentation time based on a substance-related variable included in the learning schedule;
        automatically identifies a second presentation time based on an updated time-related variable in the updated learning schedule;
        automatically identifies a second electronic content object associated with the second presentation time;
        determines, based on monitoring of a third interface that includes a first electronic notification including one or more elements configured to receive input, that input or lack of input indicates that the user is not on track to reach the target mastery metric;
        determines that it is unlikely that the user would engage in a rescheduled learning episode that is scheduled during one or more time periods;
        calculates a schedule variable based on a function and an updated educational performance metric, the updated educational performance metric being calculated based on the monitoring; and
        automatically reassociates within an updated learning schedule, each learning episode of at least one of the plurality of learning episodes with an updated time-related variable that is not within the one or more time periods; and
    an interface engine that:
        displays a first interface configured to receive the one or more first inputs;
        displays one or more second interfaces configured to receive one or more second inputs;
        displays the third interface that includes the first electronic notification at the presentation time via a device of the user, the first electronic notification including the one or more elements configured to receive input that corresponds to a request to access the identified electronic content object, wherein the identified electronic content object is displayed at the device of the user upon detecting that the one or more elements have received input that corresponds to the request; and
        displays a fourth interface that includes a second electronic notification at the second presentation time.

2. The educational-app system for dynamically setting user-specific schedules as recited in claim 1, further comprising:
    a performance assessment engine that:
        analyzes one or more responses received via the device of the user and submitted in response to an assessment content object presented via the device; and
        determines the performance metric based on the analysis.

3. The educational-app system for dynamically setting user-specific schedules as recited in claim 1, wherein the dynamic learning scheduler further:
  identifies the target mastery metric,
    wherein the target time is associated with the target mastery metric.

4. The educational-app system for dynamically setting user-specific schedules as recited in claim 3, wherein the interface engine further receives input via the device of the user, the target mastery metric being based on the input.

5. The educational-app system for dynamically setting user-specific schedules as recited in claim 1, wherein the adjusting the learning schedule comprises adding a new learning episode to the plurality of learning episodes, the new learning episode being associated with a new time-related variable indicative of when the new learning episode is to occur.

6. The educational-app system for dynamically setting user-specific schedules as recited in claim 1, wherein identifying the content object includes selecting between a set of content objects, each content object in the set of content objects being associated with a concept.

7. The educational-app system for dynamically setting user-specific schedules as recited in claim 1, further comprising:
  a usage monitor that determines that the content object was not accessed by the device of the user in response to the presentation of the electronic notification,
  wherein the dynamic learning scheduler further adjusts the learning schedule based on the determination, the adjustment including:
    adding a new learning episode to the plurality of learning episodes, the new learning episode being associated with a substance-related variable corresponding to the substance-related variable used to identify the content object; or
    changing a time-related variable associated with a learning episode in the plurality of learning episodes.

8. The educational-app system for dynamically setting user-specific schedules as recited in claim 1, wherein:
  the content availer further retrieves the content object for a content-object data store, and
  the interface engine causes at least part of the content object to be presented as part of the electronic notification or subsequent to the presentation of, and in association with, the electronic notification.

9. A computer-implemented method for dynamically setting user-specific schedules, the method comprising:
  displaying a first interface configured to receive one or more first inputs;
  identifying an educational performance metric reflecting a past educational performance of a user enrolled in a class based on the one or more first inputs;
  displaying one or more second interfaces configured to receive one or more second inputs;
  identifying one or more corresponding educational performance metrics reflecting a past educational performance of other students enrolled in the class based on the one or more second inputs;
  identifying a target time for providing at least one response to one or more questions;
  accessing a learning schedule, the learning schedule including an identification of a plurality of learning episodes, each of the plurality of learning episodes being associated with a time-related variable indicative of when the learning episode is to occur and a substance-related variable indicative of a learning substance for the learning episode;
  adjusting the learning schedule based on:
    the identified educational performance metric reflecting the past educational performance of the user enrolled in the class;
    the one or more corresponding educational performance metrics reflecting the past educational performance of other students enrolled in the class;
    the target time; and
    a target mastery metric;
  wherein the adjusted learning schedule is associated with the user;
  automatically identifying a first presentation time based on a time-related variable in the learning schedule;
  automatically identifying an electronic content object associated with the presentation time based on a substance-related variable included in the learning schedule;
  displaying a third interface that includes a first electronic notification at the presentation time via a device of the user, the first electronic notification including one or more elements configured to receive input that corresponds to a request to access the identified electronic content object, wherein the identified electronic content object is displayed at the device of the user upon detecting that the one or more elements have received input that corresponds to the request;
  constantly monitoring any inputs received at the third interface;
  determining, based on the monitoring, that input or lack of input indicates that the user is not on track to reach the target mastery metric;
  determining, at one or more processors, that it is unlikely that the user would engage in a rescheduled learning episode that is scheduled during one or more time periods;
  calculating an updated educational performance metric based on the monitoring;
  calculating, at the one or more processors, a schedule variable based on a function and the updated educational performance metric;
  automatically reassociating, at the one or more processors, within an updated learning schedule, each learning episode of at least one of the plurality of learning episodes with an updated time-related variable that is not within the one or more time periods;
  automatically identifying, at the one or more processors, a second presentation time based on an updated time-related variable in the updated learning schedule;
  automatically identifying, at the one or more processors, a second electronic content object associated with the second presentation time; and
  displaying a fourth interface that includes a second electronic notification at the second presentation time.

10. The method for dynamically setting user-specific schedules as recited in claim 9, further comprising:
  analyzing one or more responses received via the device of the user and submitted in response to an assessment content object presented via the device; and
  determining the performance metric based on the analysis.

11. The method for dynamically setting user-specific schedules as recited in claim 9, further comprising:
  identifying the target mastery metric,
    wherein the target time is associated with the target mastery metric.

12. The method for dynamically setting user-specific schedules as recited in claim 11, further comprising receiving input via the device of the user, the target mastery metric being based on the input.

13. The method for dynamically setting user-specific schedules as recited in claim 9, wherein the adjusting the learning schedule comprises adding a learning episode to the plurality of learning episodes, the new learning episode being associated with a new time-related variable indicative of when the new learning episode is to occur.

14. The method for dynamically setting user-specific schedules as recited in claim 9, wherein identifying the content object includes selecting between a set of content objects, each content object in the set of content objects being associated with a concept.

15. The method for dynamically setting user-specific schedules as recited in claim 9, further comprising:
  determining that the content object was not accessed by the device of the user in response to the presentation of the electronic notification; and
  further adjusting the learning schedule based on the determination, the adjustment including:
    adding a new learning episode to the plurality of learning episodes, the new learning episode being associated with a substance-related variable corresponding to the substance-related variable used to identify the content object; or
    changing a time-related variable associated with a learning episode in the plurality of learning episodes.

16. The method for dynamically setting user-specific schedules as recited in claim 9, further comprising:
  retrieving the content object from a content-object data store,
  wherein at least part of the content object is presented as part of the electronic notification or subsequent to the presentation of, and in association with, the electronic notification.

17. A computer-program product tangibly embodied in a non-transitory machine-readable storage medium, including instructions configured to cause one or more data processors to perform actions including:
  displaying a first interface configured to receive one or more first inputs;
  identifying an educational performance metric reflecting a past educational performance of a user enrolled in a class based on the one or more first inputs;
  displaying one or more second interfaces configured to receive one or more second inputs;
  identifying one or more corresponding educational performance metrics reflecting a past educational performance of other students enrolled in the class based on the one or more second inputs;
  identifying a target time for providing at least one response to one or more questions;
  accessing a learning schedule, the learning schedule including an identification of a plurality of learning episodes, each of the plurality of learning episodes being associated with a time-related variable indicative of when the learning episode is to occur and a substance-related variable indicative of a learning substance for the learning episode;
  adjusting the learning schedule based on:
    the identified educational performance metric reflecting the past educational performance of the user enrolled in the class;
    the one or more corresponding educational performance metrics reflecting the past educational performance of other students enrolled in the class;
    the target time; and
    a target mastery metric;
  wherein the adjusted learning schedule is associated with the user;
  automatically identifying a first presentation time based on a time-related variable in the learning schedule;
  automatically identifying an electronic content object associated with the presentation time based on a substance-related variable included in the learning schedule;
  displaying a third interface that includes a first electronic notification at the presentation time via a device of the user, the first electronic notification including one or more elements configured to receive input that corresponds to a request to access the identified electronic content object, wherein the identified electronic content object is displayed at the device of the user upon detecting that the one or more elements have received input that corresponds to the request;
  constantly monitoring any inputs received at the third interface;
  determining, based on the monitoring, that input or lack of input indicates that the user is not on track to reach the target mastery metric;
  determining, at one or more processors, that it is unlikely that the user would engage in a rescheduled learning episode that is scheduled during one or more time periods;
  calculating an updated educational performance metric based on the monitoring;
  calculating, at the one or more processors, a schedule variable based on a function and the updated educational performance metric;
  automatically reassociating, at the one or more processors, within an updated learning schedule, each learning episode of at least one of the plurality of learning episodes with an updated time-related variable that is not within the one or more time periods;
  automatically identifying, at the one or more processors, a second presentation time based on an updated time-related variable in the updated learning schedule;
  automatically identifying, at the one or more processors, a second electronic content object associated with the second presentation time; and
  displaying a fourth interface that includes a second electronic notification at the second presentation time.

18. The computer-program product as recited in claim 17, the actions further comprising:
  analyzing one or more responses received via the device of the user and submitted in response to an assessment content object presented via the device; and
  determining the performance metric based on the analysis.

19. The computer-program product as recited in claim 17, the actions further comprising:
  identifying the target mastery metric,
  wherein the target time is associated with the target mastery metric.

20. The computer-program product as recited in claim 17, the actions further comprising receiving input via the device of the user, the target mastery metric being based on the input.

* * * * *